(12) United States Patent
Kamikawabata et al.

(10) Patent No.: US 12,483,075 B2
(45) Date of Patent: Nov. 25, 2025

(54) STATOR CORE AND ROTARY ELECTRIC MACHINE

(71) Applicant: NIPPON STEEL CORPORATION, Tokyo (JP)

(72) Inventors: Masahito Kamikawabata, Tokyo (JP); Miho Tomita, Tokyo (JP); Tesshu Murakawa, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 845 days.

(21) Appl. No.: 17/775,754

(22) PCT Filed: Nov. 13, 2020

(86) PCT No.: PCT/JP2020/042469
§ 371 (c)(1),
(2) Date: May 10, 2022

(87) PCT Pub. No.: WO2021/095857
PCT Pub. Date: May 20, 2021

(65) Prior Publication Data
US 2022/0385119 A1    Dec. 1, 2022

(30) Foreign Application Priority Data

Nov. 15, 2019 (JP) ................. 2019-206648

(51) Int. Cl.
*H02K 1/02* (2006.01)
*C22C 38/00* (2006.01)
(Continued)

(52) U.S. Cl.
CPC ............. *H02K 1/02* (2013.01); *C22C 38/001* (2013.01); *C22C 38/002* (2013.01); *C22C 38/02* (2013.01);
(Continued)

(58) Field of Classification Search
CPC .......... H02K 1/02; H02K 1/148; H02K 1/141; H02K 2213/03; C22C 38/10;
(Continued)

(56) References Cited

U.S. PATENT DOCUMENTS 11,136,645 B2 * 10/2021 Zaizen ................. C21D 8/0205
2014/0238558 A1 * 8/2014 Fujikura ................. C22C 38/06
148/307

(Continued)

FOREIGN PATENT DOCUMENTS

JP    8-47185 A    2/1996
JP    8-223830 A    8/1996
(Continued)

*Primary Examiner* — Alexander A Singh
(74) *Attorney, Agent, or Firm* — Birch, Stewart, Kolasch & Birch, LLP

(57) ABSTRACT

The present invention is a stator core (21) including a plurality of split cores (30), in which the plurality of split cores (30) are configured by laminating core pieces (40) made of an electrical steel sheet, the electrical steel sheet is a predetermined electrical steel sheet, and, in the core pieces (40) of at least one split core (30) in the plurality of split cores (30), the radial directions of teeth (41) and extension directions of core backs (42) are all along a direction in which magnetic characteristics of the electrical steel sheet are excellent.

10 Claims, 7 Drawing Sheets

(51) Int. Cl.
  *C22C 38/02* (2006.01)
  *C22C 38/04* (2006.01)
  *C22C 38/06* (2006.01)
  *C22C 38/08* (2006.01)
  *C22C 38/10* (2006.01)
  *C22C 38/16* (2006.01)
  *C22C 38/60* (2006.01)
(52) U.S. Cl.
  CPC .............. *C22C 38/04* (2013.01); *C22C 38/06* (2013.01); *C22C 38/08* (2013.01); *C22C 38/10* (2013.01); *C22C 38/16* (2013.01); *C22C 38/60* (2013.01); *C22C 2202/02* (2013.01)
(58) Field of Classification Search
  CPC ....... C22C 38/002; C22C 38/06; C22C 38/16; C22C 38/08; C22C 38/001; C22C 38/02; C22C 38/04; C22C 38/60; C22C 38/004; C22C 2202/02; C21D 9/46; C21D 8/12; C21D 8/1266; C21D 8/1233; C21D 8/1272

See application file for complete search history.

(56) References Cited

U.S. PATENT DOCUMENTS

2017/0274432 A1* 9/2017 Okubo .................... C22C 38/12
2018/0309330 A1 10/2018 Ueda et al.

FOREIGN PATENT DOCUMENTS

| JP | 10-271716 A | 10/1998 |
| JP | 2002-320350 A | 10/2002 |
| JP | 2011-67055 A | 3/2011 |
| JP | 2019-178380 A | 10/2019 |
| WO | WO2017/090571 A1 | 6/2017 |

* cited by examiner

STATOR CORE AND ROTARY ELECTRIC MACHINE

TECHNICAL FIELD OF THE INVENTION

The present invention relates to a stator core and a rotary electric machine. In particular, the present invention is preferably used in stator cores including a plurality of split cores.

Priority is claimed on Japanese Patent Application No. 2019-206648, filed in Japan on Nov. 15, 2019, the content of which is incorporated herein by reference.

RELATED ART

As stator cores (iron cores) in rotary electric machines, a stator core in which a plurality of split cores are arrayed along the circumferential direction is known.

In Patent Document 1, an iron core of a motor is split into laminated iron core pieces by a splitting surface, and the laminated iron core pieces are made of a unidirectional electrical steel sheet or a bidirectional electrical steel sheet. It is disclosed that coilings are coiled around the laminated iron core pieces via an insulating portion and the laminated iron core pieces are laminated with directions of easy magnetization individually determined. According to such a motor, magnetic fluxes passing through the laminated iron core pieces always flow in a direction of easy magnetization of the grain-oriented electrical steel sheet, and a change in the directions of magnetic fluxes flowing in pole teeth or cavities during rotation becomes small, it is possible to reduce iron losses, exciting currents, cogging torque, strain of induced voltages or torque ripple.

Patent Document 2 discloses a motor having an iron core in which a plurality of laminated iron cores having a tooth portion in which a stator extends in the radial direction are arrayed in the circumferential direction. The laminated iron core has a plurality of sheet-shaped iron core pieces laminated in the sheet thickness direction. The iron core piece is made of a non-oriented electrical steel sheet, and the rolling direction of the iron core piece has an inclination with respect to the radial direction. In addition, it is disclosed that the laminated iron core is made by laminating iron core pieces having the same inclination, and at least a pair of laminated iron cores adjacent to each other in the circumferential direction have inclinations opposite to each other. With such a motor, it is possible to reduce cogging torque and torque ripple.

PRIOR ART DOCUMENT

Patent Document

[Patent Document 1] Japanese Unexamined Patent Application, First Publication No. H8-47185
[Patent Document 2] PCT International Publication No. WO 2017/090571

DISCLOSURE OF THE INVENTION

Problems to be Solved by the Invention

However, in neither Patent Document 1 nor Patent Document 2, electrical steel sheets were studied. Therefore, there is room for improvement in improving magnetic characteristics in conventional stator cores having a plurality of split cores.

An object of the present invention is to improve the magnetic characteristics of a stator core including a plurality of split cores.

Means for Solving the Problem

In order to solve the above-described problems, the present invention employs the following configurations.

(1) A stator core according to an aspect of the present invention is a stator core including a plurality of split cores, in which the plurality of split cores are each configured by laminating core pieces made of an electrical steel sheet, the electrical steel sheet has a chemical composition containing, by mass %, C: 0.0100% or less, Si: 1.50% to 4.00%, sol. Al: 0.0001% to 1.0%, S: 0.0100% or less, N: 0.0100% or less, one or more selected from the group consisting of Mn, Ni, Co, Pt, Pb, Cu and Au: 2.50% to 5.00% in total, Sn: 0.000% to 0.400%, Sb: 0.000% to 0.400%, P: 0.000% to 0.400%, and one or more selected from the group consisting of Mg, Ca, Sr, Ba, Ce, La, Nd, Pr, Zn and Cd: 0.0000% to 0.0100% in total, in which, when a Mn content (mass %) is indicated by [Mn], a Ni content (mass %) is indicated by [Ni], a Co content (mass %) is indicated by [Co], a Pt content (mass %) is indicated by [Pt], a Pb content (mass %) is indicated by [Pb], a Cu content (mass %) is indicated by [Cu], an Au content (mass %) is indicated by [Au], a Si content (mass %) is indicated by [Si], and a sol. Al content (mass %) is indicated by [sol. Al], Formula (1) below is satisfied, and a remainder includes Fe and impurities, when a value of B50 in a rolling direction is indicated by B50L, a value of B50 in a direction inclined by 45° from the rolling direction is indicated by B50D1, a value of B50 in a direction inclined by 90° from the rolling direction is indicated by B50C, and a value of B50 in a direction inclined by 135° from the rolling direction is indicated by B50D2, Formula (2) and Formula (3) below are satisfied, and an X-ray random intensity ratio in {100}<011> is 5 or more and less than 30, a sheet thickness is 0.50 mm or less, and, in the core pieces of at least one split core in the plurality of split cores, radial directions of teeth and extension directions of core backs are all along a direction in which magnetic characteristics of the electrical steel sheet are excellent.

$$([Mn]+[Ni]+[Co]+[Pt]+[Pb]+[Cu]+[Au])-([Si]+[sol.Al])>0\% \tag{1}$$

$$(B50D1+B50D2)/2>1.7T \tag{2}$$

$$(B50D1+B50D2)/2>(B50L+B50C)/2 \tag{3}$$

Here, the magnetic flux density B50 refers to a magnetic flux density when the tooth is excited with a magnetic field strength of 5000 A/m.

(2) The stator core according to (1) above, in which Formula (4) below may be satisfied.

$$(B50D1+B50D2)/2>1.1\times(B50L+B50C)/2 \tag{4}$$

(3) The stator core according to (1) above, in which Formula (5) below may be satisfied.

$$(B50D1+B50D2)/2>1.2\times(B50L+B50C)/2 \tag{5}$$

(4) The stator core according to (1) above, in which Formula (6) below may be satisfied.

$$(B50D1+B50D2)/2>1.8T \tag{6}$$

(5) The stator core according to (1) above, in which, in the electrical steel sheet, the direction in which the magnetic characteristics are excellent may be directions at angles of 45° and 135° from the rolling direction of the electrical steel sheet, the radial directions of the teeth may be along any one direction at an angle of 45° or 135° from the rolling direction, and the extension directions of the core backs may be along the other direction at an angle of 45° or 135° from the rolling direction.

(6) The stator core according to any one of (1) to (5) above, in which, in the plurality of split cores, in the core pieces of all of the split cores, both the radial directions of the teeth and the extension directions of the core backs may be along the direction in which the magnetic characteristics of the electrical steel sheet are excellent.

(7) The stator core according to any one of (1) to (5) above, in which the plurality of split cores each may have a tooth portion, and, among a plurality of the tooth portions, widths of the tooth portions along the direction in which the magnetic characteristics are excellent may be narrower than widths of the tooth portions not along the direction in which the magnetic characteristics are excellent.

(8) The stator core according to (7) above, in which a product of the width of the tooth portion and a magnetic flux density in the tooth portion when excited with a predetermined magnetic field strength may be substantially constant in each tooth portion of the plurality of split cores.

(9) A rotary electric machine according to one aspect of the present invention includes the stator core according to any one of (1) to (8) above.

Effects of the Invention

According to the above-described aspects of the present invention, it is possible to improve the magnetic characteristics of a stator core including a plurality of split cores.

EMBODIMENTS OF THE INVENTION

Figure 1:
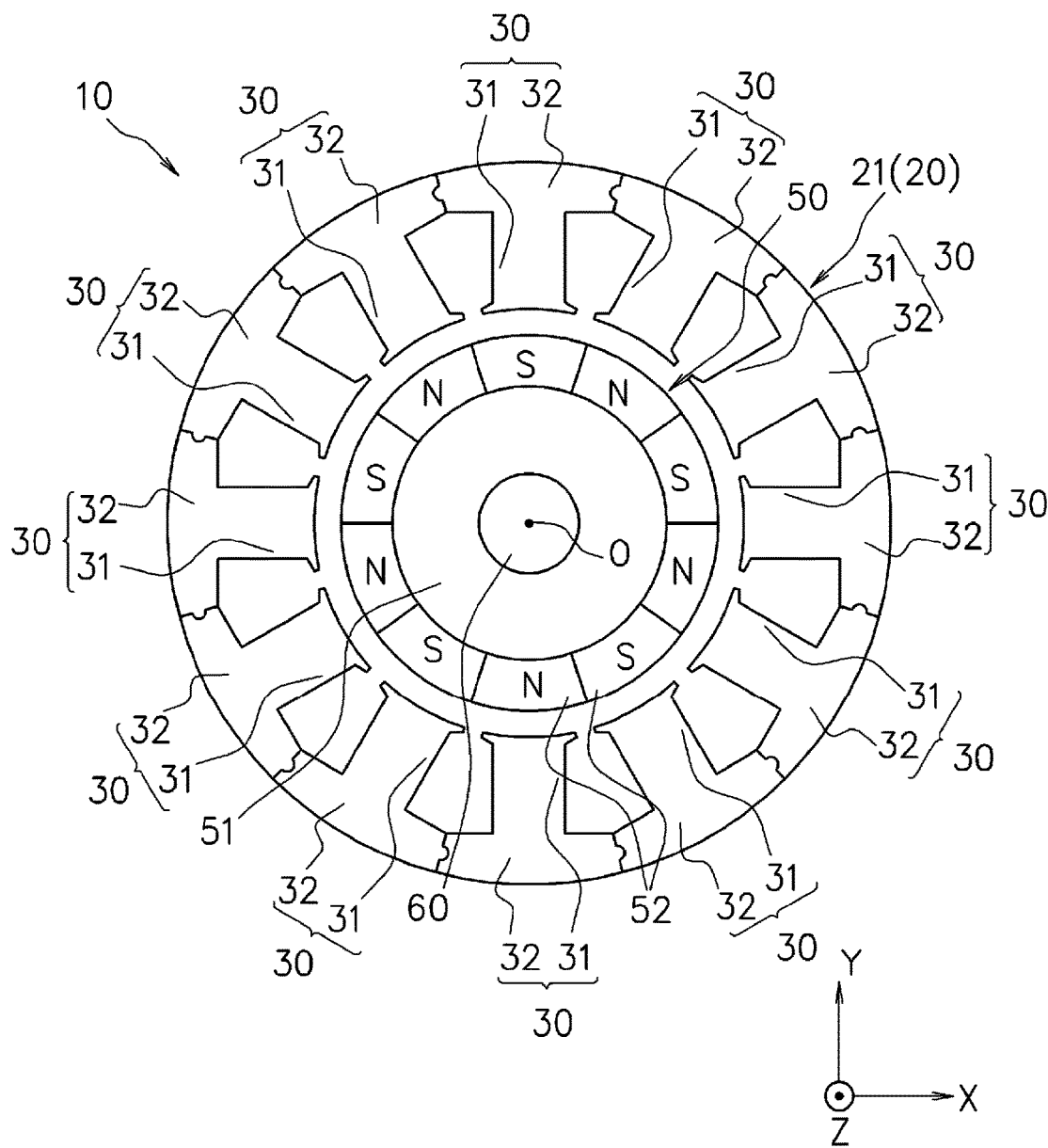
FIG. 1 is a view showing an example of the configuration of a rotary electric machine.

<Example of Electrical Steel Sheet Used for Split Core>

First, an electrical steel sheet that is used for a split core of an embodiment to be described below will be described.

Here, the chemical composition of steel that is used in a non-oriented electrical steel sheet according to the present embodiment that is an example of the electrical steel sheet that is used for the split core of the embodiment and a manufacturing method therefor will be described. In the following description, "%" that is the unit of the amount of each element that is contained in the non-oriented electrical steel sheet of the present embodiment or the steel means "mass %" unless particularly otherwise described. In addition, numerical limiting ranges described below using "to" include the lower limit value and the upper limit value in the ranges. Numerical values expressed with 'more than' or 'less than' are not included in numerical ranges. The non-oriented electrical steel sheet and the steel have a chemical composition in which ferrite-austenite transformation (hereinafter, α-γ transformation) can occur, C: 0.0100% or less, Si: 1.50% to 4.00%, sol. Al: 0.0001% to 1.0%, S: 0.0100% or less, N: 0.0100% or less, one or more selected from the group consisting of Mn, Ni, Co, Pt, Pb, Cu, and Au: 2.50% to 5.00% in total, Sn: 0.000% to 0.400%, Sb: 0.000% to 0.400%, P: 0.000% to 0.400%, and one or more selected from the group consisting of Mg, Ca, Sr, Ba, Ce, La, Nd, Pr, Zn, and Cd: 0.0000% to 0.0100% in total are contained, and the remainder includes Fe and impurities. Furthermore, the amounts of Mn, Ni, Co, Pt, Pb, Cu, Au, Si, and sol. Al satisfy predetermined conditions to be described below. Examples of the impurities are impurities that are contained in a raw material such as ore or a scrap or impurities that are contained during manufacturing steps.

«C: 0.0100% or Less»

C increases the iron loss or causes magnetic ageing. Therefore, the C content is preferably as small as possible. Such a phenomenon becomes significant when the C content exceeds 0.0100%. Therefore, the C content is set to 0.0100% or less. A reduction in the C content also contributes to uniform improvement in the magnetic characteristics in all directions in the sheet surface. The lower limit of the C content is not particularly limited, but is preferably set to 0.0005% or more based on the cost of a decarburization treatment at the time of refining.

«Si: 1.50% to 4.00%»

Si increases the electric resistance to decrease the eddy-current loss to reduce the iron loss or increases the yield ratio to improve blanking workability on iron cores. When the Si content is less than 1.50%, these action effects cannot be sufficiently obtained. Therefore, the Si content is set to 1.50% or more. On the other hand, when the Si content is more than 4.00%, the magnetic flux density decreases, the blanking workability deteriorates due to an excessive increase in hardness, or cold rolling becomes difficult. Therefore, the Si content is set to 4.00% or less.

«sol. Al: 0.0001% to 1.0%» sol. Al increases the electric resistance to decrease the eddy-current loss to reduce the iron loss. sol. Al also contributes to improvement in the relative magnitude of a magnetic flux density B50 with respect to the saturated magnetic flux density. Here, the magnetic flux density B50 refers to a magnetic flux density when the tooth is excited with a magnetic field strength of 5000 A/m. When the sol. Al content is less than 0.0001%, these action effects cannot be sufficiently obtained. In addition, Al also has a desulfurization-accelerating effect in steelmaking. Therefore, the sol. Al content is set to 0.0001% or more. On the other hand, when the sol. Al content is more than 1.0%, the magnetic flux density decreases or the yield ratio is decreased to degrade the branking workability. Therefore, the sol. Al content is set to 1.0% or less.

«S: 0.0100% or less»

S is not an essential element and is contained in steel, for example, as an impurity. S causes the precipitation of fine MnS and thereby impairs recrystallization and the growth of crystal grains in annealing. Therefore, the S content is preferably as small as possible. An increase in the iron loss and a decrease in the magnetic flux density resulting from such impairing of recrystallization and crystal grain growth become significant when the S content is more than 0.0100%. Therefore, the S content is set to 0.0100% or less. The lower limit of the S content is not particularly limited, but is preferably set to 0.0003% or more based on the cost of a desulfurization treatment at the time of refining.

«N: 0.0100% or less»

Similar to C, N degrades the magnetic characteristics, and thus the N content is preferably as small as possible. Therefore, the N content is set to 0.0100% or less. The lower limit of the N content is not particularly limited, but is preferably set to 0.0010% or more based on the cost of a denitrification treatment at the time of refining.

«One or More Selected from the Group Consisting of Mn, Ni, Co, Pt, Pb, Cu, and Au: 2.50% to 5.00% in Total»

Since these elements are necessary elements for causing α-γ transformation, these elements need to be contained in total of 2.50% or more. On the other hand, when the total exceeds 5.00%, there is a case where the cost increases and the magnetic flux density decreases. Therefore, the total of these elements is set to 5.00% or less.

In addition, as a condition for enabling the occurrence of the α-γ transformation, the chemical composition is made to further satisfy the following condition. That is, when the Mn content (mass %) is indicated by [Mn], the Ni content (mass %) is indicated by [Ni], the Co content (mass %) is indicated by [Co], the Pt content (mass %) is indicated by [Pt], the Pb content (mass %) is indicated by [Pb], the Cu content (mass %) is indicated by [Cu], the Au content (mass %) is indicated by [Au], the Si content (mass %) is indicated by [Si], and the sol. Al content (mass %) is indicated by [sol. Al], by mass %, Formula (1) below is preferably satisfied.

$$([Mn]+[Ni]+[Co]+[Pt]+[Pb]+[Cu]+[Au])-([Si]+[sol. Al])>0\% \quad (1)$$

In a case where Formula (1) is not satisfied, since α-γ transformation does not occur, the magnetic flux density decreases.

«Sn: 0.000% to 0.400%, Sb: 0.000% to 0.400% and P: 0.000% to 0.400%»

Sn or Sb improves the texture after cold rolling or recrystallization to improve the magnetic flux density. Therefore, these elements may be contained as necessary; however, when excessively contained, steel is embrittled. Therefore, the Sn content and the Sb content are both set to 0.400% or less. In addition, P may be contained to ensure the hardness of the steel sheet after recrystallization; however, when excessively contained, the embrittlement of steel is caused. Therefore, the P content is set to 0.400% or less. In the case of imparting an additional effect on the magnetic characteristics or the like as described above, one or more selected from the group consisting of 0.020% to 0.400% of Sn, 0.020% to 0.400% of Sb, and 0.020% to 0.400% of P is preferably contained.

«One or More Selected from the Group Consisting of Mg, Ca, Sr, Ba, Ce, La, Nd, Pr, Zn, and Cd: 0.0000% to 0.0100% in Total»

Mg, Ca, Sr, Ba, Ce, La, Nd, Pr, Zn, and Cd react with S in molten steel during the casting of the molten steel to generate the precipitate of a sulfide, an oxysulfide, or both. Hereinafter, Mg, Ca, Sr, Ba, Ce, La, Nd, Pr, Zn, and Cd will be collectively referred to as "coarse precipitate forming element" in some cases. The grain sizes in the precipitate of the coarse precipitate forming element are approximately 1 µm to 2 µm, which is significantly larger than the grain sizes (approximately 100 nm) in the fine precipitates of MnS, TiN, AN, or the like. Therefore, these fine precipitates adhere to the precipitate of the coarse precipitate forming element and are less likely to impair recrystallization and the growth of crystal grains in annealing such as process annealing. In order to sufficiently obtain this action effect, the total of these elements is preferably 0.0005% or more. However, when the total of these elements exceeds 0.0100%, the total amount of the sulfide, the oxysulfide, or both becomes excessive, and recrystallization and the growth of crystal grains in process annealing are impaired. Therefore, the amount of the coarse precipitate forming element is set to 0.0100% or less in total.

«Texture»

Next, the texture of the non-oriented electrical steel sheet of the present embodiment will be described. The details of a manufacturing method will be described below, but the non-oriented electrical steel sheet of the present embodiment is a chemical composition in which a-y transformation can occur and becomes a structure in which {100} crystal grains have grown by the refinement of the structure by rapid cooling immediately after finish rolling in hot rolling. Therefore, in the non-oriented electrical steel sheet of the present embodiment, the pile-up strength in a {100}<011> orientation becomes 5 to 30, and the magnetic flux density B50 in a 45° direction with respect to a rolling direction becomes particularly high. As described above, the magnetic flux density becomes high in a specific direction, but a high magnetic flux density can be obtained in all directions on average as a whole. When the pile-up strength in the {100}<011> orientation becomes less than 5, the pile-up strength in a {111}<112> orientation, which decreases the magnetic flux density, becomes high, and the magnetic flux density decreases as a whole. In addition, in a manufacturing method in which the pile-up strength in the {100}<011> orientation exceeds 30, it is necessary to thicken a hot-rolled sheet, which creates a problem of the manufacturing becoming difficult.

The pile-up strength in the {100}<011> orientation can be measured by an X-ray diffraction method or an electron backscatter diffraction (EBSD) method. Since the reflection angles or the like of X-rays and electron beams from samples differ depending on crystal orientations, crystal orientation strengths can be obtained from the reflection strength or the like based on a random orientation sample. The pile-up strength in the {100}<011> orientation of the preferable non-oriented electrical steel sheet of the present embodiment becomes 5 to 30 in terms of the X-ray random intensity ratio. At this time, crystal orientations may be measured by EBSD, and values converted to X-ray random intensity ratios may be used.

«Thickness»

Next, the thickness of the non-oriented electrical steel sheet of the present embodiment will be described. The thickness of the non-oriented electrical steel sheet of the present embodiment is 0.50 mm or less. When the thickness exceeds 0.50 mm, it is not possible to obtain an excellent high-frequency iron loss. Therefore, the thickness is set to 0.50 mm or less.

«Magnetic Characteristics»

Next, the magnetic characteristics of the non-oriented electrical steel sheet of the present embodiment will be described. At the time of investigating the magnetic characteristics, the value of B50, which is the magnetic flux density of the non-oriented electrical steel sheet of the present embodiment, is measured. In the manufactured non-oriented electrical steel sheet, one rolling direction and the other rolling direction cannot be distinguished. Therefore, in the present embodiment, the rolling direction refers to both the one rolling direction and the other rolling direction. When the value of B50 in the rolling direction is indicated by B50L, the value of B50 in a direction inclined by 45° from the rolling direction is indicated by B50D1, the value of B50 in a direction inclined by 90° from the rolling direction is indicated by B50C, and the value of B50 in a direction inclined by 135° from the rolling direction is indicated by B50D2, an anisotropy of the magnetic flux density in which B50D1 and B50D2 are the highest and B50L and B50C are the lowest is observed.

Here, in the case of considering, for example, an all-direction (0° to 360°) distribution of the magnetic flux density for which the clockwise (which may be counterclockwise) direction is regarded as a positive direction, when the rolling direction is set to 0° (one direction) and 180° (the other direction), B50D1 becomes the B50 values at 45° and 225°, and B50D2 becomes the B50 values at 135° and 315°. Similarly, B50L becomes the B50 values at 0° and 180°, and B50C becomes the B50 values at 90° and 270°. The B50 value at 45° and the B50 value at 225° strictly coincide with each other, and the B50 value at 135° and the B50 value at 315° strictly coincide with each other. However, since there is a case where it is not easy to make the magnetic characteristics the same at the time of actual manufacturing, there is a case where B50D1 and B50D2 do not strictly coincide with each other. Similarly, there is a case where the B50 value at 0° and the B50 value at 180° strictly coincide with each other, and the B50 value at 90° and the B50 value at 270° strictly coincide with each other, but B50L and B50C do not strictly coincide with each other. In the non-oriented electrical steel sheet of the present embodiment, Formula (2) and Formula (3) below are satisfied using the average value of B50D1 and B50D2 and the average value of B50L and B50C.

$$(B50D1+B50D2)/2>1.7T \quad (2)$$

$$(B50D1+B50D2)/2>(B50L+B50C)/2 \quad (3)$$

When the magnetic flux density is measured as described above, the average value of B50D1 and B50D2 becomes 1.7 T or more as in Formula (2), and a high anisotropy of the magnetic flux density as in Formula (3) is confirmed.

Furthermore, in addition to satisfying Formula (1), the anisotropy of the magnetic flux density is preferably higher than in Formula (3) as shown in Formula (4) below.

$$(B50D1+B50D2)/2>1.1\times(B50L+B50C)/2 \quad (4)$$

Furthermore, the anisotropy of the magnetic flux density is preferably higher as shown in Formula (5) below.

$$(B50D1+B50D2)/2>1.2\times(B50L+B50C)/2 \quad (5)$$

Furthermore, the average value of B50D1 and B50D2 preferably becomes 1.8 T or more as shown in Formula (6) below.

$$(B50D1+B50D2)/2>1.8T \quad (6)$$

The above-described 45° is a theoretical value, and there is a case where it is not easy to match the rolling direction to 45° in actual manufacturing. Therefore, rolling directions that are not strictly matched to 45° are also regarded as the rolling direction at 45°. This is also true for the 0°, 90°, 135°, 180°, 225°, 270°, and 315°.

The magnetic flux density can be measured from 55 mm×55 mm samples cut out in directions at angles of 45°, 0°, and the like with respect to the rolling direction using a single-sheet magnetic measuring instrument.

«Manufacturing Method»

Next, an example of a manufacturing method for the non-oriented electrical steel sheet of the present embodiment will be described. At the time of manufacturing the non-oriented electrical steel sheet of the present embodiment, for example, hot rolling, cold rolling (first cold rolling), process annealing (first annealing), skin pass rolling (second cold rolling), finish annealing (third annealing), stress relieving annealing (second annealing), and the like are performed.

First, the above-described steel is heated and hot-rolled. The steel is, for example, a slab that is manufactured by normal continuous casting. Rough rolling and finish rolling of the hot rolling are performed at temperatures in the γ range (Ar1 temperature or higher). That is, hot rolling is performed such that the finishing temperature of the finish rolling becomes the Ar1 temperature or higher, and the coiling temperature becomes higher than 250° C. and 600° C. or lower. Therefore, the steel transforms from austenite to ferrite by subsequent cooling, whereby the structure is refined. When subsequent cold rolling is performed in a state where the structure has been refined, swelling recrystallization (hereinafter, bulging) is likely to occur, and it is possible to facilitate the {100} crystal grains, which are, normally, difficult to grow.

In addition, at the time of manufacturing the non-oriented electrical steel sheet of the present embodiment, furthermore, a temperature (finishing temperature) when the steel passes through the final pass of finish rolling is set to the Ar1 temperature or higher, and the coiling temperature is set to higher than 250° C. and 600° C. or lower. The steel transforms from austenite to ferrite, whereby the crystal structure is refined. The crystal structure is refined as described above, whereby it is possible to facilitate the occurrence of bulging through the subsequent cold rolling and process annealing.

After that, the hot-rolled steel sheet is coiled and pickled without being annealed, and the hot-rolling steel sheet is cold-rolled. In the cold rolling, the rolling reduction is preferably set to 80% to 95%. At a rolling reduction of smaller than 80%, bulging is less likely to occur. At a rolling reduction of larger than 95%, it becomes easier for the {100} crystal grains to grow by subsequent bulging, but it is necessary to thicken the hot-rolled steel sheet, the coiling of the hot-rolled steel sheet becomes difficult, and operations are likely to become difficult. The rolling reduction of the cold rolling is more preferably 86% or larger. At a rolling reduction of the cold rolling of 86% or larger, bulging is more likely to occur.

When the cold rolling ends, subsequently, process annealing is performed. At the time of manufacturing the non-oriented electrical steel sheet of the present embodiment, process annealing is performed at a temperature at which the steel does not transform into austenite. That is, the temperature in the process annealing is preferably set to lower than the Ac1 temperature. When the process annealing is performed as described above, bulging occurs, and it becomes easy for the {100} crystal grains to grow. In addition, the time of the process annealing is preferably set to 5 seconds to 60 seconds.

When the process annealing ends, next, skin pass rolling is performed. When skin pass rolling and annealing are performed in a state where bulging has occurred as described above, the {100} crystal grains further grow from a portion where the bulging has occurred as a starting point. This is because the skin pass rolling makes it difficult for strains to be accumulated in the {100}<011> crystal grains and makes it easy for strains to be accumulated in the {111}<112> crystal grains, and, in the subsequent annealing, the {100}<011> crystal grains including a small number of strains intrude into the {111}<112> crystal grains using the difference in strains as a driving force. This intrusion phenomenon that is caused by the strain difference as the driving force is called strain-induced boundary migration (hereinafter, SIBM). The rolling reduction of skin pass rolling is preferably 5% to 25%. At a rolling reduction of smaller than 5%, since the strain amount is too small, SIBM does not occur in the subsequent annealing, and the {100}<011> crystal grains do not become large. On the other hand, at a rolling reduction of larger than 25%, the strain amount becomes too large, and recrystallization nucleation (hereinafter, nucleation) in which new crystal grains are formed in the {111}<112> crystal grains occurs. In this nucleation, since almost all grains that are newly formed are {111}<112> crystal grain, the magnetic characteristics become poor.

After the skin pass rolling, final annealing is performed to release strains and improve the workability. Similarly, the final annealing is also set to a temperature at which the steel does not transform into austenite, and the temperature of the final annealing is set to lower than the Ac1 temperature. When the final annealing is performed as described above, the {100}<011> crystal grains intrude the {111}<112> crystal grains, and the magnetic characteristics can be improved. In addition, at the time of the final annealing, a time taken for the temperature to reach 600° C. to the Ac1 temperature is set to 1200 seconds or shorter. When this annealing time is too short, almost all strains created by the skin pass remain, and the steel sheet warps when blanked into a complicated shape. On the other hand, when the annealing time is too long, crystal grains become too coarse, the droop surface becomes large at the time of blanking, and the blanking accuracy becomes poor.

When the finish annealing ends, the non-oriented electrical steel sheet is formed or the like in order to produce a desired iron and steel member. In addition, in order to remove strains or the like formed by forming or the like (for example, blanking) performed on the iron and steel member made of the non-oriented electrical steel sheet, stress relieving annealing is performed on the iron and steel member. In the present embodiment, in order to cause SIBM at lower than the Ac1 temperature and to coarsen crystal grain sizes, the temperature of the stress relieving annealing is set to, for example, approximately 800° C., and the time of the stress relieving annealing is set to approximately two hours. The stress relieving annealing makes it possible to improve the magnetic characteristics.

In the non-oriented electrical steel sheet (iron and steel member) of the present embodiment, the high B50 of Formula (1) and the excellent anisotropy of Formula (2) can be obtained mainly by the finish rolling that is performed at the Ar1 temperature or higher in the hot rolling step in the above-described manufacturing method. Furthermore, the rolling reduction in the skin pass rolling step is set to approximately 10%, whereby a more excellent anisotropy of Formula (4) can be obtained.

The Ar1 temperature in the present embodiment is obtained from a thermal expansion change of the steel (steel sheet) in the middle of cooling at an average cooling rate of 1° C./second. In addition, the Ac1 temperature in the present embodiment is obtained from a thermal expansion change of the steel (steel sheet) in the middle of heating at an average heating rate of 1° C./second.

The steel member made of the non-oriented electrical steel sheet of the present embodiment can be manufactured as described above.

Next, the non-oriented electrical steel sheet of the present embodiment will be specifically described while describing examples. The examples to be described below are simply examples of the non-oriented electrical steel sheet, and the non-oriented electrical steel sheet is not limited to the following examples.

First Example

Molten steel was cast, thereby producing ingots having components shown in Table 1 and Table 2 below. Here, the column "left side of formula" indicates the value of the left side of Formula (1) described above. After that, the produced ingots were hot-rolled by being heated up to 1150° C. and rolled such that the sheet thicknesses became 2.5 mm. In addition, after the end of finish rolling, the hot-rolled steel sheets were coiled. The temperatures (finishing temperatures) in a stage of the final pass of the finish rolling at this time were 830° C. and were all temperatures higher than the Ar1 temperature. For No. 108 where no γ-α transformation occurred, the finishing temperature was set to 850° C. In addition, regarding the coiling temperature, the hot-rolled steel sheets were coiled under the conditions shown in Table 1.

Next, the hot-rolled steel sheets were pickled to remove scales and cold-rolled in rolling reductions after the cold rolling shown in Table 1. In addition, process annealing was performed at 700° C. for 30 seconds in a non-oxidizing atmosphere. Next, rolling was performed in rolling reductions of the second round of cold rolling (skin pass rolling) shown in Table 1.

Next, in order to investigate the magnetic characteristics, after the second round of cold rolling (skin pass rolling), final annealing was performed at 800° C. for 30 seconds to produce 55 mm×55 mm samples by shearing, then, stress relieving annealing was performed at 800° C. for two hours, and the magnetic flux densities B50 were measured. As the measurement samples, 55 mm×55 mm samples were collected in two directions at angles of 0° C. and 45° C. with respect to the rolling direction. In addition, these two types of samples were measured, and the magnetic flux densities B50 at 0°, 45°, 90°, and 135° with respect to the rolling direction were each regarded as B50L, B50D1, B50C, and B50D2.

TABLE 1

| No. | C | Si | sol-Al | S | N | Mn | Ni | Co | Pt | Pb | Cu | Au | Formula (1) | Hot rolling Coiling temperature | Hot rolling Sheet thickness | Cold rolling Rolling reduction | Cold rolling Sheet thickness | Second round of cold rolling Rolling reduction |
|---|---|---|---|---|---|---|---|---|---|---|---|---|---|---|---|---|---|---|
| 101 | 0.0008 | 2.52 | 0.010 | 0.0017 | 0.0019 | 3.12 | — | — | — | — | — | — | 0.60 | 500 | 2.5 | 85% | 0.385 | 9% |
| 102 | 0.0006 | 2.51 | 0.013 | 0.0017 | 0.0024 | — | 3.14 | — | — | — | — | — | 0.62 | 500 | 2.5 | 85% | 0.385 | 9% |
| 103 | 0.0007 | 2.48 | 0.013 | 0.0023 | 0.0017 | — | — | 3.07 | — | — | — | — | 0.57 | 500 | 2.5 | 85% | 0.385 | 9% |
| 104 | 0.0009 | 2.48 | 0.010 | 0.0023 | 0.0017 | — | — | — | 3.06 | — | — | — | 0.58 | 500 | 2.5 | 85% | 0.385 | 9% |
| 105 | 0.0008 | 2.48 | 0.010 | 0.0017 | 0.0017 | — | — | — | — | 3.12 | — | — | 0.63 | 500 | 2.5 | 85% | 0.385 | 9% |
| 106 | 0.0007 | 2.53 | 0.009 | 0.0020 | 0.0017 | — | — | — | — | — | 3.13 | — | 0.59 | 500 | 2.5 | 85% | 0.385 | 9% |
| 107 | 0.0012 | 2.47 | 0.009 | 0.0019 | 0.0022 | — | — | — | — | — | — | 3.06 | 0.58 | 500 | 2.5 | 85% | 0.385 | 9% |
| 108 | 0.0011 | 3.23 | 0.010 | 0.0020 | 0.0021 | 3.06 | — | — | — | — | — | — | −0.18 | 500 | 2.5 | 85% | 0.385 | 9% |
| 109 | 0.0012 | 2.49 | 0.301 | 0.0023 | 0.0022 | 3.36 | — | — | — | — | — | — | 0.57 | 500 | 2.5 | 85% | 0.385 | 9% |
| 110 | 0.0008 | 2.50 | 0.006 | 0.0022 | 0.0022 | 3.09 | — | — | — | — | — | — | 0.58 | 500 | 4.0 | 90% | 0.420 | 17% |
| 111 | 0.0009 | 2.54 | 0.010 | 0.0020 | 0.0022 | 3.13 | — | — | — | — | — | — | 0.58 | 500 | 3.0 | 87% | 0.385 | 9% |
| 112 | 0.0010 | 2.49 | 0.006 | 0.0022 | 0.0019 | 3.07 | — | — | — | — | — | — | 0.58 | 500 | 2.5 | 86% | 0.355 | 1% |
| 113 | 0.0007 | 2.48 | 0.014 | 0.0020 | 0.0019 | 3.14 | — | — | — | — | — | — | 0.64 | 500 | 7.0 | 95% | 0.385 | 9% |
| 114 | 0.0009 | 2.50 | 0.014 | 0.0024 | 0.0019 | 3.12 | — | — | — | — | — | — | 0.60 | 500 | 2.5 | 89% | 0.275 | 9% |
| 115 | 0.0013 | 2.48 | 0.011 | 0.0021 | 0.0023 | 3.10 | — | — | — | — | — | — | 0.61 | 500 | 1.5 | 93% | 0.110 | 9% |
| 116 | 0.0012 | 2.49 | 0.601 | 0.0020 | 0.0021 | 3.69 | — | — | — | — | — | — | 0.60 | 700 | 2.8 | 86% | 0.385 | 9% |
| 117 | 0.0008 | 2.50 | 0.600 | 0.0020 | 0.0019 | 3.69 | — | — | — | — | — | — | 0.59 | 600 | 2.8 | 86% | 0.385 | 9% |
| 118 | 0.0012 | 2.49 | 0.600 | 0.0020 | 0.0020 | 3.71 | — | — | — | — | — | — | 0.61 | 500 | 2.8 | 86% | 0.385 | 9% |
| 119 | 0.0009 | 2.52 | 0.599 | 0.0018 | 0.0018 | — | 3.70 | — | — | — | — | — | 0.58 | 500 | 2.8 | 86% | 0.385 | 9% |
| 120 | 0.0011 | 2.47 | 0.599 | 0.0019 | 0.0021 | — | — | 3.68 | — | — | — | — | 0.61 | 500 | 2.8 | 86% | 0.385 | 9% |
| 121 | 0.0012 | 2.53 | 0.599 | 0.0019 | 0.0020 | — | — | — | 3.69 | — | — | — | 0.55 | 500 | 2.8 | 86% | 0.385 | 9% |
| 122 | 0.0008 | 2.52 | 0.599 | 0.0020 | 0.0021 | — | — | — | — | 3.73 | — | — | 0.60 | 500 | 2.8 | 86% | 0.385 | 9% |
| 123 | 0.0012 | 2.48 | 0.604 | 0.0021 | 0.0020 | — | — | — | — | — | 3.71 | — | 0.63 | 500 | 2.8 | 86% | 0.385 | 9% |
| 124 | 0.0012 | 2.48 | 0.598 | 0.0021 | 0.0019 | — | — | — | — | — | — | 3.69 | 0.61 | 500 | 2.8 | 86% | 0.385 | 9% |
| 125 | 0.0011 | 2.49 | 0.600 | 0.0020 | 0.0019 | 3.68 | — | — | — | — | — | — | 0.59 | 400 | 2.8 | 86% | 0.385 | 9% |
| 126 | 0.0012 | 2.48 | 0.600 | 0.0019 | 0.0020 | 3.70 | — | — | — | — | — | — | 0.62 | 300 | 2.8 | 86% | 0.385 | 9% |
| 127 | 0.0010 | 2.50 | 0.602 | 0.0020 | 0.0019 | 3.69 | — | — | — | — | — | — | 0.59 | 200 | 2.8 | 86% | 0.385 | 9% |
| 128 | 0.0011 | 2.52 | 0.900 | 0.0018 | 0.0021 | 4.00 | — | — | — | — | — | — | 0.58 | 500 | 2.8 | 86% | 0.385 | 9% |
| 129 | 0.0010 | 2.49 | 0.600 | 0.0020 | 0.0021 | 3.72 | — | — | — | — | — | — | 0.63 | 500 | 2.0 | 81% | 0.385 | 9% |
| 130 | 0.0011 | 2.50 | 0.598 | 0.0022 | 0.0021 | 3.72 | — | — | — | — | — | — | 0.62 | 500 | 1.8 | 79% | 0.385 | 9% |

TABLE 2

| No. | Characteristics of steel sheet {100}<011> | Sheet thickness | B50D1 | B50D2 | B50L | B50C | Formula (2) | Formula (3) | Formula (4) | Formula (5) | Formula (6) | Note |
|---|---|---|---|---|---|---|---|---|---|---|---|---|
| 101 | 14.6 | 0.35 | 1.809 | 1.812 | 1.558 | 1.550 | Satisfied | Satisfied | Satisfied | Not satisfied | Satisfied | Present Invention |
| 102 | 14.9 | 0.35 | 1.814 | 1.809 | 1.563 | 1.553 | Satisfied | Satisfied | Satisfied | Not satisfied | Satisfied | Present Invention |
| 103 | 15.2 | 0.35 | 1.809 | 1.814 | 1.563 | 1.547 | Satisfied | Satisfied | Satisfied | Not satisfied | Satisfied | Present Invention |
| 104 | 15.1 | 0.35 | 1.807 | 1.814 | 1.564 | 1.547 | Satisfied | Satisfied | Satisfied | Not satisfied | Satisfied | Present Invention |
| 105 | 15.3 | 0.35 | 1.813 | 1.807 | 1.558 | 1.548 | Satisfied | Satisfied | Satisfied | Not satisfied | Satisfied | Present Invention |
| 106 | 14.8 | 0.35 | 1.814 | 1.808 | 1.556 | 1.547 | Satisfied | Satisfied | Satisfied | Not satisfied | Satisfied | Present Invention |
| 107 | 14.6 | 0.35 | 1.807 | 1.807 | 1.559 | 1.547 | Satisfied | Satisfied | Satisfied | Not satisfied | Satisfied | Present Invention |
| 108 | 0.3 | 0.35 | 1.548 | 1.551 | 1.633 | 1.583 | Not satisfied | Not satisfied | Not satisfied | Not satisfied | Not satisfied | Comparative Example |
| 109 | 15.4 | 0.35 | 1.792 | 1.787 | 1.548 | 1.554 | Satisfied | Satisfied | Satisfied | Not satisfied | Not satisfied | Present Invention |
| 110 | 25.1 | 0.35 | 1.846 | 1.851 | 1.538 | 1.532 | Satisfied | Satisfied | Satisfied | Satisfied | Satisfied | Present Invention |
| 111 | 19.8 | 0.35 | 1.818 | 1.817 | 1.547 | 1.540 | Satisfied | Satisfied | Satisfied | Not satisfied | Satisfied | Present Invention |
| 112 | 3.1 | 0.35 | 1.684 | 1.678 | 1.586 | 1.587 | Not satisfied | Satisfied | Not satisfied | Not satisfied | Not satisfied | Comparative Example |
| 113 | 34.6 | 0.35 | 1.861 | 1.862 | 1.551 | 1.551 | Satisfied | Satisfied | Satisfied | Not satisfied | Not satisfied | Comparative Example |
| 114 | 20.0 | 0.25 | 1.812 | 1.813 | 1.541 | 1.526 | Satisfied | Satisfied | Satisfied | Not satisfied | Satisfied | Present Invention |
| 115 | 19.7 | 0.10 | 1.839 | 1.843 | 1.586 | 1.590 | Satisfied | Satisfied | Satisfied | Not satisfied | Satisfied | Present Invention |
| 116 | 7.0 | 0.35 | 1.727 | 1.730 | 1.528 | 1.529 | Satisfied | Satisfied | Satisfied | Not satisfied | Not satisfied | Present Invention |
| 117 | 12.0 | 0.35 | 1.773 | 1.767 | 1.538 | 1.532 | Satisfied | Satisfied | Satisfied | Not satisfied | Not satisfied | Present Invention |
| 118 | 15.0 | 0.35 | 1.784 | 1.778 | 1.543 | 1.531 | Satisfied | Satisfied | Satisfied | Not satisfied | Not satisfied | Present Invention |
| 119 | 14.6 | 0.35 | 1.786 | 1.785 | 1.540 | 1.532 | Satisfied | Satisfied | Satisfied | Not satisfied | Not satisfied | Present Invention |
| 120 | 14.6 | 0.35 | 1.783 | 1.788 | 1.541 | 1.528 | Satisfied | Satisfied | Satisfied | Not satisfied | Not satisfied | Present Invention |
| 121 | 15.3 | 0.35 | 1.784 | 1.785 | 1.539 | 1.531 | Satisfied | Satisfied | Satisfied | Not satisfied | Not satisfied | Present Invention |
| 122 | 14.7 | 0.35 | 1.783 | 1.785 | 1.539 | 1.533 | Satisfied | Satisfied | Satisfied | Not satisfied | Not satisfied | Present Invention |
| 123 | 15.1 | 0.35 | 1.786 | 1.787 | 1.541 | 1.529 | Satisfied | Satisfied | Satisfied | Not satisfied | Not satisfied | Present Invention |
| 124 | 15.1 | 0.35 | 1.785 | 1.785 | 1.538 | 1.527 | Satisfied | Satisfied | Satisfied | Not satisfied | Not satisfied | Present Invention |
| 125 | 12.2 | 0.35 | 1.768 | 1.772 | 1.541 | 1.531 | Satisfied | Satisfied | Satisfied | Not satisfied | Not satisfied | Present Invention |
| 126 | 11.2 | 0.35 | 1.762 | 1.765 | 1.536 | 1.531 | Satisfied | Satisfied | Satisfied | Not satisfied | Not satisfied | Present Invention |
| 127 | 6.9 | 0.35 | 1.734 | 1.735 | 1.517 | 1.529 | Satisfied | Satisfied | Satisfied | Not satisfied | Not satisfied | Present Invention |
| 128 | 15.2 | 0.35 | 1.772 | 1.774 | 1.539 | 1.519 | Satisfied | Satisfied | Satisfied | Not satisfied | Not satisfied | Present Invention |
| 129 | 10.4 | 0.35 | 1.746 | 1.746 | 1.532 | 1.521 | Satisfied | Satisfied | Satisfied | Not satisfied | Not satisfied | Present Invention |
| 130 | 5.9 | 0.35 | 1.731 | 1.736 | 1.519 | 1.528 | Satisfied | Satisfied | Satisfied | Not satisfied | Not satisfied | Present Invention |

Underlined values in Table 1 and Table 2 indicate that the conditions deviate from the scope of the present invention. In all of No. 101 to No. 107, No. 109 to No. 111, and No. 114 to No. 130, which were invention examples, the magnetic flux densities B50 were favorable values both in the 45° direction and on the whole circumference average. However, in No. 116 and No. 127, since the coiling temperatures were outside the appropriate range, the magnetic flux densities B50 were slightly low. In No. 129 and No. 130, since the rolling reductions of the cold rolling were small, the magnetic flux densities B50 were slightly low compared with No. 118 in which the components and the coiling temperature were the same. On the other hand, in No. 108, which was a comparative example, since the Si concentration was high, the value of the left side of the formula was 0 or less, and the composition did not undergo α-γ transformation, the magnetic flux densities B50 were all low. In No. 112, which was a comparative example, since the skin pass rolling reduction was decreased, the {100}<011> strength was less than 5, and all of the magnetic flux densities B50 were low. No. 113, which was a comparative example, the {100}<011> strength became 30 or more, which deviated from the present invention. In No. 113, since the thickness of the hot-rolled sheet was 7 mm, there was a drawback of an operation difficulty.

Second Example

Molten steel was cast, thereby producing ingots having components shown in Table 3 below. After that, the produced ingots were hot-rolled by being heated up to 1150° C. and rolled such that the sheet thicknesses became 2.5 mm. In addition, after the end of finish rolling, the hot-rolled steel sheets were coiled. The finishing temperatures in a stage of the final pass of the finish rolling at this time were 830° C. and were all temperatures higher than the Ar1 temperature.

Next, the hot-rolled steel sheets were pickled to remove scales and cold-rolled until the sheet thicknesses became 0.385 mm. In addition, process annealing was performed in a non-oxidizing atmosphere, and the temperatures in the process annealing were controlled such that the recrystallization rates became 85%. Next, a second round of cold rolling (skin pass rolling) was performed until the sheet thicknesses became 0.35 mm.

Next, in order to investigate the magnetic characteristics, after the second round of cold rolling (skin pass rolling), final annealing was performed at 800° C. for 30 seconds to produce 55 mm×55 mm samples by shearing, then, stress relieving annealing was performed at 800° C. for two hours, and the magnetic flux densities B50 and the iron losses W10/400 were measured. The magnetic flux densities B50 were measured in the same order as in the first example. Incidentally, the iron loss W10/400 was measured as an energy loss (W/kg) that was caused in a sample when an alternating-current magnetic field of 400 Hz was applied such that the maximum magnetic flux density became 1.0 T. As the iron loss, the average value of the results measured at 0°, 45°, 90°, and 135° with respect to the rolling direction was employed.

TABLE 3

| | Component (wt %) | | | | | | | | | |
|---|---|---|---|---|---|---|---|---|---|---|
| No. | C | Si | sol-Al | S | N | Mn | Sn | Sb | P | Mg |
| 201 | 0.0006 | 2.49 | 0.010 | 0.0022 | 0.0019 | 3.10 | — | — | — | — |
| 202 | 0.0010 | 2.53 | 0.007 | 0.0022 | 0.0017 | 3.07 | 0.052 | — | — | — |
| 203 | 0.0009 | 2.50 | 0.014 | 0.0019 | 0.0019 | 3.12 | — | 0.053 | — | — |
| 204 | 0.0010 | 2.52 | 0.009 | 0.0018 | 0.0022 | 3.11 | — | — | 0.048 | — |
| 205 | 0.0010 | 2.47 | 0.007 | 0.0023 | 0.0024 | 3.14 | — | — | — | 0.0051 |
| 206 | 0.0007 | 2.48 | 0.009 | 0.0018 | 0.0022 | 3.11 | — | — | — | — |
| 207 | 0.0010 | 2.47 | 0.012 | 0.0019 | 0.0017 | 3.09 | — | — | — | — |
| 208 | 0.0009 | 2.54 | 0.014 | 0.0017 | 0.0016 | 3.12 | — | — | — | — |
| 209 | 0.0011 | 2.48 | 0.010 | 0.0023 | 0.0018 | 3.12 | — | — | — | — |
| 210 | 0.0008 | 2.50 | 0.011 | 0.0021 | 0.0020 | 3.11 | — | — | — | — |
| 211 | 0.0012 | 2.49 | 0.007 | 0.0017 | 0.0020 | 3.14 | — | — | — | — |
| 212 | 0.0009 | 2.49 | 0.008 | 0.0020 | 0.0022 | 3.13 | — | — | — | — |
| 213 | 0.0012 | 2.46 | 0.011 | 0.0019 | 0.0016 | 3.07 | — | — | — | — |
| 214 | 0.0008 | 2.52 | 0.011 | 0.0021 | 0.0021 | 3.10 | — | — | — | — |

| | Component (wt %) | | | | | | | | | Formula |
|---|---|---|---|---|---|---|---|---|---|---|
| No. | Ca | Sr | Ba | Ce | La | Nd | Pr | Zn | Cd | (1) |
| 201 | — | — | — | — | — | — | — | — | — | 0.60 |
| 202 | — | — | — | — | — | — | — | — | — | 0.54 |
| 203 | — | — | — | — | — | — | — | — | — | 0.60 |
| 204 | — | — | — | — | — | — | — | — | — | 0.58 |
| 205 | — | — | — | — | — | — | — | — | — | 0.66 |
| 206 | 0.0053 | — | — | — | — | — | — | — | — | 0.62 |
| 207 | — | 0.0051 | — | — | — | — | — | — | — | 0.61 |
| 208 | — | — | 0.0047 | — | — | — | — | — | — | 0.56 |
| 209 | — | — | — | 0.0049 | — | — | — | — | — | 0.63 |
| 210 | — | — | — | — | 0.0052 | — | — | — | — | 0.60 |
| 211 | — | — | — | — | — | 0.0051 | — | — | — | 0.64 |
| 212 | — | — | — | — | — | — | 0.0048 | — | — | 0.63 |
| 213 | — | — | — | — | — | — | — | 0.0054 | — | 0.59 |
| 214 | — | — | — | — | — | — | — | — | 0.0052 | 0.57 |

TABLE 4

| | Characteristics of steel sheet | | | Magnetic characteristics after annealing at 800° C. for two hours | | | | | |
|---|---|---|---|---|---|---|---|---|---|
| No. | {100}<011> | Sheet thickness | B50D1 | B50D2 | B50L | B50C | Whole circumference average W10/400 | Note |
| 201 | 14.7 | 0.35 | 1.811 | 1.809 | 1.561 | 1.553 | 15.28 | Present Invention |
| 202 | 15.1 | 0.35 | 1.824 | 1.820 | 1.574 | 1.564 | 15.30 | Present Invention |
| 203 | 15.1 | 0.35 | 1.822 | 1.822 | 1.568 | 1.561 | 15.33 | Present Invention |
| 204 | 15.4 | 0.35 | 1.818 | 1.821 | 1.567 | 1.559 | 15.32 | Present Invention |
| 205 | 15.2 | 0.35 | 1.809 | 1.810 | 1.561 | 1.551 | 14.89 | Present Invention |
| 206 | 14.7 | 0.35 | 1.808 | 1.812 | 1.562 | 1.551 | 14.90 | Present Invention |
| 207 | 14.6 | 0.35 | 1.812 | 1.807 | 1.556 | 1.550 | 14.93 | Present Invention |
| 208 | 15.3 | 0.35 | 1.813 | 1.809 | 1.557 | 1.549 | 14.91 | Present Invention |
| 209 | 15.3 | 0.35 | 1.812 | 1.808 | 1.562 | 1.554 | 14.89 | Present Invention |
| 210 | 14.8 | 0.35 | 1.809 | 1.810 | 1.562 | 1.547 | 14.92 | Present Invention |
| 211 | 14.9 | 0.35 | 1.813 | 1.808 | 1.563 | 1.551 | 14.88 | Present Invention |
| 212 | 15.2 | 0.35 | 1.813 | 1.810 | 1.563 | 1.548 | 14.91 | Present Invention |
| 213 | 14.8 | 0.35 | 1.813 | 1.810 | 1.563 | 1.553 | 14.94 | Present Invention |

TABLE 4-continued

| | Characteristics of steel sheet | | Magnetic characteristics after annealing at 800° C. for two hours | | | | Whole circumference | |
|---|---|---|---|---|---|---|---|---|
| No. | {100}<011> | Sheet thickness | B50D1 | B50D2 | B50L | B50C | average W10/400 | Note |
| 214 | 15.3 | 0.35 | 1.811 | 1.807 | 1.564 | 1.553 | 14.88 | Present Invention |

No. 201 to No. 214 were all invention examples and all had favorable magnetic characteristics. In particular, the magnetic flux densities B50 were higher in No. 202 to No. 204 than in No. 201, No. 205 to No. 214, and the iron losses W10/400 were lower in No. 205 to No. 214 than in No. 201 to No. 204.

In the following description, the direction inclined by 45° from the rolling direction described in the description of <Example of electrical steel sheet used for split core> will be referred to as the angle of 45° from the rolling direction as necessary, and the direction inclined by 135° from the rolling direction will be referred to as the angle of 135° from the rolling direction as necessary. In addition, the direction inclined by θ° from the rolling direction will be referred to as the direction in which an angle formed with the rolling direction is θ° as necessary. As described above, the direction inclined by θ° from the rolling direction and the direction in which an angle formed with the rolling direction is θ° have the same meaning.

The above-described non-oriented electrical steel sheet has been newly developed by the present inventors, and the magnetic characteristics are most favorable in two directions at angles of 45° and 135° from the rolling direction. On the other hand, the magnetic characteristics are poorest in two directions at angles of 0° and 90° from the rolling direction. Here, the 45° and 135° are theoretical values, and, at the time of actual manufacturing, there is a case where it is not easy to match the angle to 45° and 135°. Therefore, as long as the directions in which the magnetic characteristics are most favorable are theoretically two directions at angle of 45° and 135° from the rolling direction, in an actual non-oriented electrical steel sheet, directions in which the 45° and 135° are not (strictly) matched to 45° and 135° are also regarded as the above-described directions. This is also true for the 0° and 90°. In addition, theoretically, the magnetic characteristics in the two directions in which the magnetic characteristics are most favorable become the same as each other, but there is a case where it is not easy to make the magnetic characteristics in the two directions the same as each other at the time of actual manufacturing. Therefore, as long as the magnetic characteristics in the two directions in which the magnetic characteristics are most favorable are theoretically the same as each other, the magnetic characteristics being not strictly the same as each other are also regarded as the above-described magnetic characteristics being the same as each other. This is also true for the two directions in which the magnetic characteristics are poorest. Clockwise angles are defined as positive angles.

<Stator Core>

The present inventors studied to configure a stator core with a plurality of split cores so that the characteristics of such a non-oriented electrical steel sheet can be effectively used and found an embodiment to be described below.

Hereinafter, an embodiment of the present invention will be described with reference to the drawings. In the following description, unless particularly otherwise described, electrical steel sheets refer to the non-oriented electrical steel sheet described in the section <Example of electrical steel sheet used for split core>. In addition, in the following description, the fact that lengths, directions, positions, and the like are the same (coincide) does not only mean a case where lengths, directions, positions, and the like are (strictly) the same (coincide), but also mean a case where lengths, directions, positions, and the like are (strictly) the same (coincide) without departing from the gist of the invention (for example, within a range of an error that occurs in manufacturing steps).

In the present embodiment, an electric motor as a rotary electric machine, specifically an alternating-current electric motor, more specifically a synchronous electric motor, and still more specifically, a permanent magnet field-type electric motor will be described as an example. This type of electric motor is preferably employed in, for example, electric vehicles.

FIG. 1 is a view showing an example of the configuration of a rotary electric machine 10. FIG. 1 is a view (plan view) of the rotary electric machine seen in a direction parallel to the axial center of the rotary electric machine. The X-Y-Z coordinates shown in FIG. 1 indicate orientation relationships in the drawing.

As shown in FIG. 1, the rotary electric machine 10 includes a stator 20 and a rotor 50. The stator 20 and rotor 50 are accommodated in a case, not shown. In addition, the stator 20 is fixed to the case.

In the present embodiment, as the rotary electric machine 10, an inner rotor type in which the rotor 50 is positioned inside the stator 20 is employed. However, as the rotary electric machine 10, an outer rotor type in which the rotor 50 is positioned outside the stator 20 may also be employed. In addition, in the present embodiment, the rotary electric machine 10 is a three-phase alternating-current motor having 10 poles and 12 slots. However, the number of poles, the number of slots, the number of phases, and the like can be changed as appropriate.

The stator 20 includes a stator core 21 and a coil, not shown.

In the following description, the axial direction of the stator core 21 (a direction along the central axis O of the stator core 21 (Z-axis direction)) will be referred to as the axial direction as necessary. In addition, the radial direction of the stator core 21 (a direction orthogonal to the central axis O of the stator core 21) will referred to as the radial direction as necessary. In addition, the circumferential direction of the stator core 21 (a direction that orbits the central axis O of the stator core 21) will be referred to as the circumferential direction as necessary.

The stator core 21 includes a plurality of split cores 30. Specifically, in the stator core 21 of the present embodiment, 12 split cores 30 are arrayed in a direction orbiting the circumferential direction, that is, the central axis O. The split cores 30 of the present embodiment each have the same shape and the same size. Each split core 30 has a tooth portion 31 and a core back portion 32.

A coiling of the stator 20 is coiled around the tooth portion 31. The tooth portion 31 protrudes inward in the radial direction from the core back portion 32. That is, the tooth portion 31 protrudes toward the central axis O along the radial direction. The tooth portions 31 are disposed at equal intervals in the circumferential direction. In the present embodiment, 12 tooth portions 31 are provided at 30° angular intervals around the central axis O of the stator core 21. The coilings of the stator 20 may be concentrated coilings or distributed coilings.

The core back portion 32 is formed in an arc shape. The plurality of split cores 30 are arrayed in the circumferential direction, whereby all of the core back portions 32 are formed in an annular shape.

Figure 2:
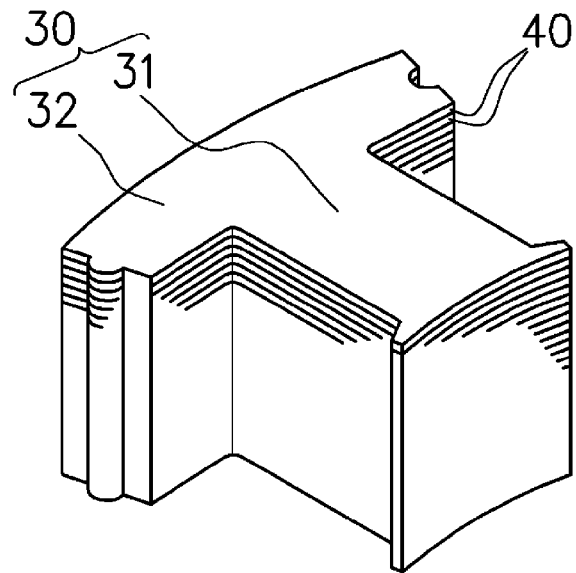
FIG. 2 is a view showing an example of the configuration of a split core.

FIG. 2 is a view showing an example of the configuration of the split core 30. FIG. 2 is a view (perspective view) of one of the plurality of split cores 30 included in the stator core 21 as obliquely viewed.

The split core 30 is configured by laminating core pieces 40 made of an electrical steel sheet. The core pieces 40 each have a sheet shape and each have the same shape and the same size. The core pieces 40 are laminated in the sheet thickness direction in the same orientation, whereby the split cores 30 have the same shape along the axial direction, that is, the central axis O.

Figure 3:
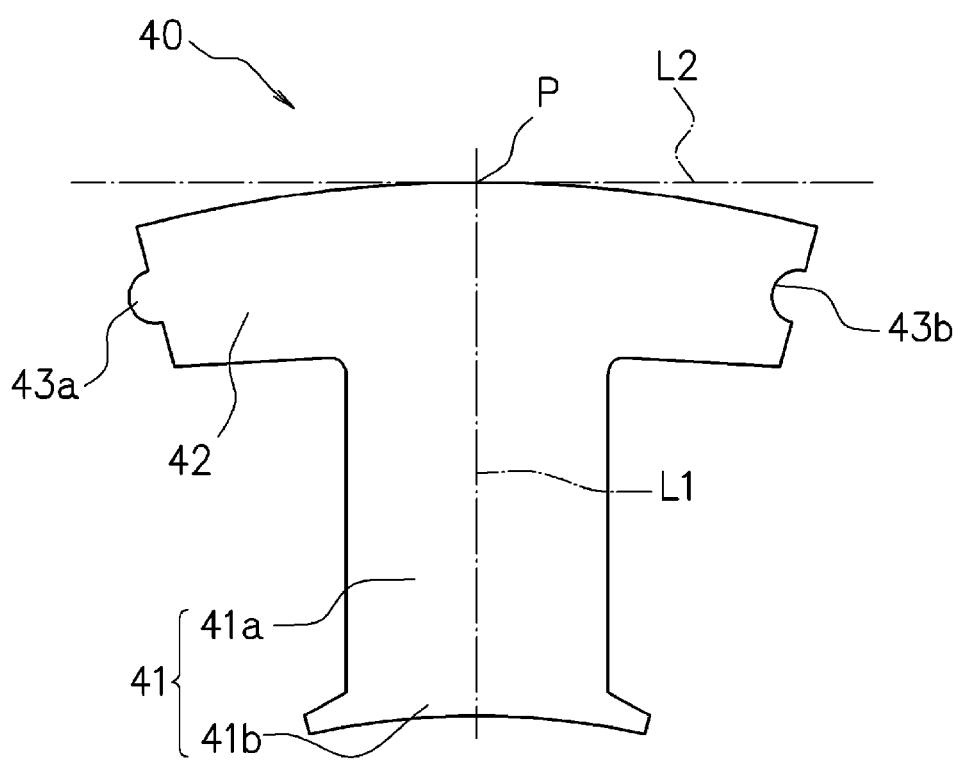
FIG. 3 is a view showing an example of the configuration of a core piece.

FIG. 3 is a view showing an example of the configuration of the core piece 40. FIG. 3 is a plan view of one of the plurality of core pieces 40 that configure the split core 30 as viewed along the central axis O. As shown in FIG. 3, the core piece 40 has a tooth 41 and a core back 42.

The teeth 41 configure the tooth portion 31 of the split core 30 when the core pieces 40 are laminated. The tooth 41 has a tooth base portion 41a extending in the radial direction from the center of the core back 42 in the circumferential direction and a flange portion 41b positioned at the tip end of the teeth base portion 41a. In a case where the rotary electric machine 10 is configured using the split cores 30, the flange portions 41b face the rotor 50.

The core backs 42 configure the core back portion 32 of the split core 30 when the core pieces 40 are laminated. The core back 42 has a protrusion 43a protruding in the circumferential direction at one end in the circumferential direction and a recessed part 43b recessed in the circumferential direction at the other end in the circumferential direction. The protrusion 43a and the recessed part 43b have shapes that are inverted from each other. In a case where the plurality of split cores 30 are arrayed in the circumferential direction, the protrusion 43a fits into the recessed part 43b of the adjacent core piece 40, and the recessed part 43b fits into the protrusion 43a of the adjacent core piece 40.

In the core piece 40, the radial direction of the tooth 41 and the extension direction of the core back 42 are orthogonal to each other. The radial direction of the tooth 41 is a direction that is parallel to the sheet surface of the tooth 41 and is along a line passing through the center of the teeth 41 in the circumferential direction as indicated by an alternate long and short dash line L1 in FIG. 3. Alternatively, the radial direction of the tooth 41 is a direction that is parallel to the sheet surface of the tooth 41 and is along a line that connects a position P that bisects the length of the outer circumference of the core back 42 and the center of a circle along the outer circumference of the core back 42.

On the other hand, the extension direction of the core back 42 is a direction orthogonal to the radial direction of the tooth 41. That is, the extension direction of the core back 42 is a direction along the tangent line to the outer circumference of the core back 42 at the position P of the alternate long and short dash line L1 and the outer circumference of the core back 42 as indicated by an alternate long and short dash line L2 in FIG. 3. Alternatively, the extension direction of the core back 42 is a direction along the tangent line to the outer circumference of the core back 42 at the position P that bisects the length of the outer circumference of the core back 42.

Returning to FIG. 1, the rotor 50 is disposed inside the stator core 21 in the radial direction. The rotor 50 includes a rotor core 51, a plurality of permanent magnets 52, and a rotating shaft 60.

The rotor core 51 is disposed concentrically with the stator core 21. The shape of the rotor core 51 is approximately circular (annular). The plurality of permanent magnets 52 are fixed to the rotor core 51. In the present embodiment, five sets (10 in total) of permanent magnets 52 are provided at 36° angular intervals around the central axis O of the rotor core 51. The rotating shaft 60 is disposed in the rotor core 51. The rotating shaft 60 is fixed to the rotor core 51.

In the present embodiment, a surface magnet-type electric motor is employed as the permanent magnet field-type motor, but an embedded magnet-type motor may be employed.

Here, in order to form the core piece 40, the core piece 40 is formed by, for example, blanking an electrical steel sheet, which is a rolled sheet-shaped base metal (hoop). The electrical steel sheet is the electrical steel sheet described in the section <Example of electrical steel sheet used for split core>. The proportions of B50, W15/50, and W15/100 (B50 proportion, W15/50 proportion, and W15/100 proportion) of the electrical steel sheet described in the section <Examples of electrical steel sheet used for split core> in a well-known non-oriented electrical steel sheet are shown in Table 5. The thicknesses of the electrical steel sheets are all 0.25 [mm]. As the well-known non-oriented electrical steel sheet, a non-oriented electrical steel sheet having W10/400 of 12.8 W/kg was used. W10/400 is an iron loss when the magnetic flux density is 1.0 T and the frequency is 400 Hz. In addition, the well-known non-oriented electrical steel sheet has excellent magnetic characteristics only in the rolling direction. In the following description, the electrical steel sheet described in the section <Example of electrical steel sheet used for split core> will also be referred to as the developed material as necessary. In addition, the well-known non-oriented electrical steel sheet will also be referred to the conventional material as necessary.

TABLE 5

| | B50 proportion [-] | W15/50 proportion [-] | W15/100 proportion [-] |
|---|---|---|---|
| Developed material | 1.051 | 0.880 | 0.865 |

Here, B50 is a magnetic flux density when excited with a magnetic field strength of 5000 [A/m], and W15/100 is an iron loss when the magnetic flux density is 1.5 [T] and the frequency is 100 [Hz]. Here, the magnetic flux density and the iron loss were measured by the method described in JIS C 2556: 2015. In addition, Table 5 shows values obtained by normalizing the average value of the developed material at each angle from the rolling direction with respect to the average value of the conventional material at each angle from the rolling direction as 1.000 (=the average value of the developed material at each angle from the rolling direction/ the average value of the conventional material at each angle from the rolling direction). As described above, the values in Table 5 are relative values (dimensionless quantities).

Table 5 shows that B50 of the developed material is larger than B50 of the conventional material by 5.1 [%]. W15/50 of the developed material is smaller than W15/50 of the conventional material by 12.0 [%]. W15/100 of the developed material is smaller than W15/100 of the conventional material by 13.5 [%]. As described above, the developed material has a larger B50 and a smaller iron loss than the conventional material.

Figure 4:
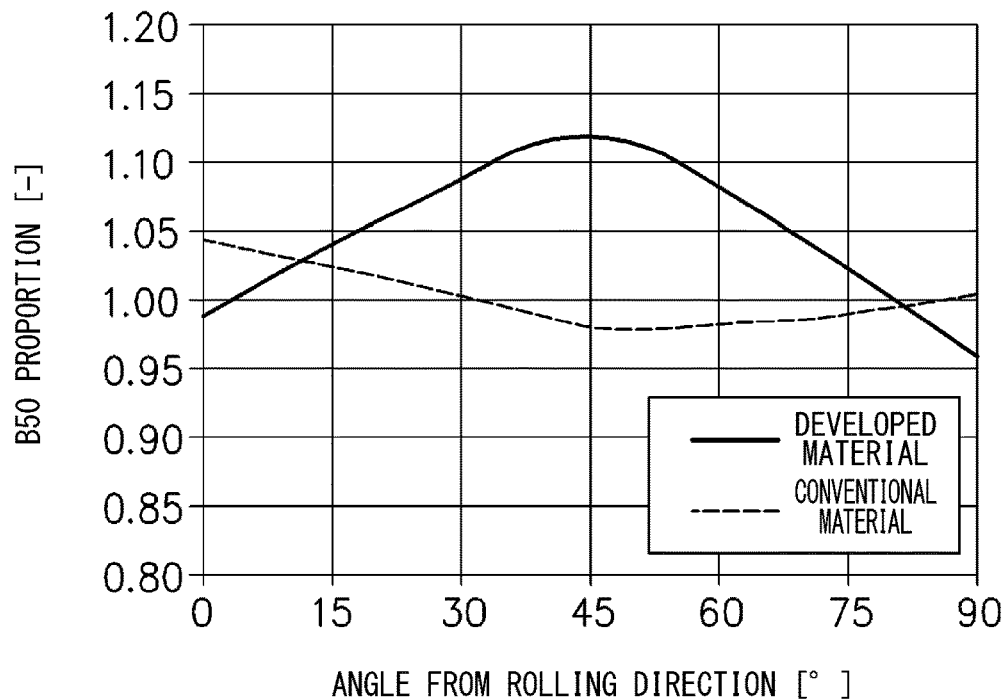
FIG. 4 is a graph showing an example of a relationship between B50 proportions and angles from a rolling direction.
Figure 5:
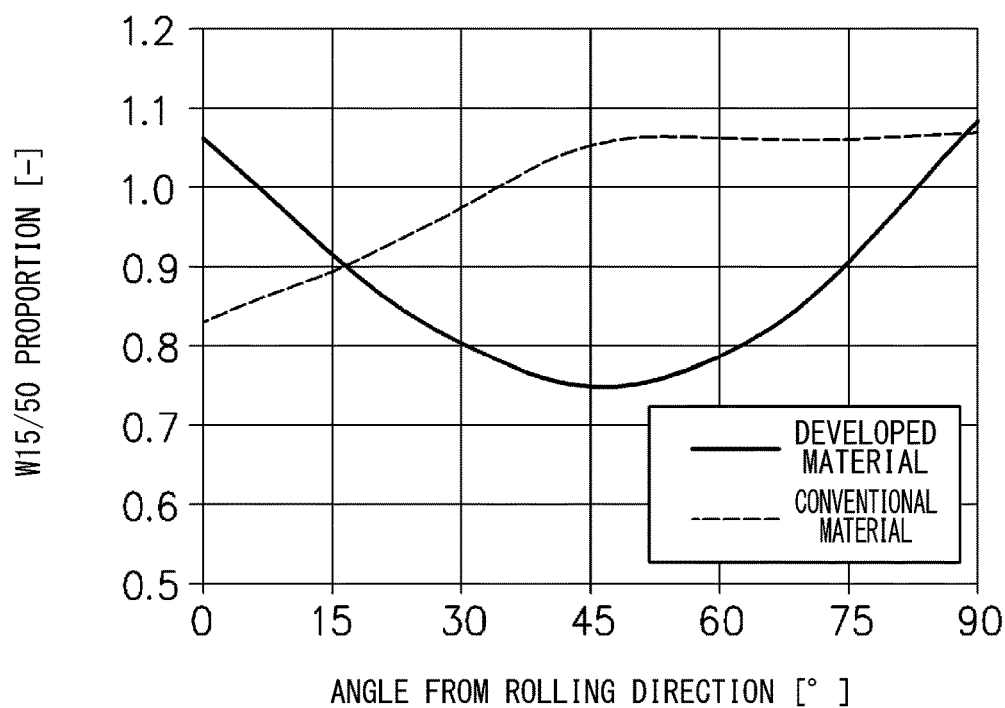
FIG. 5 is a graph showing an example of a relationship between W15/50 proportions and the angles from the rolling direction.
Figure 6:
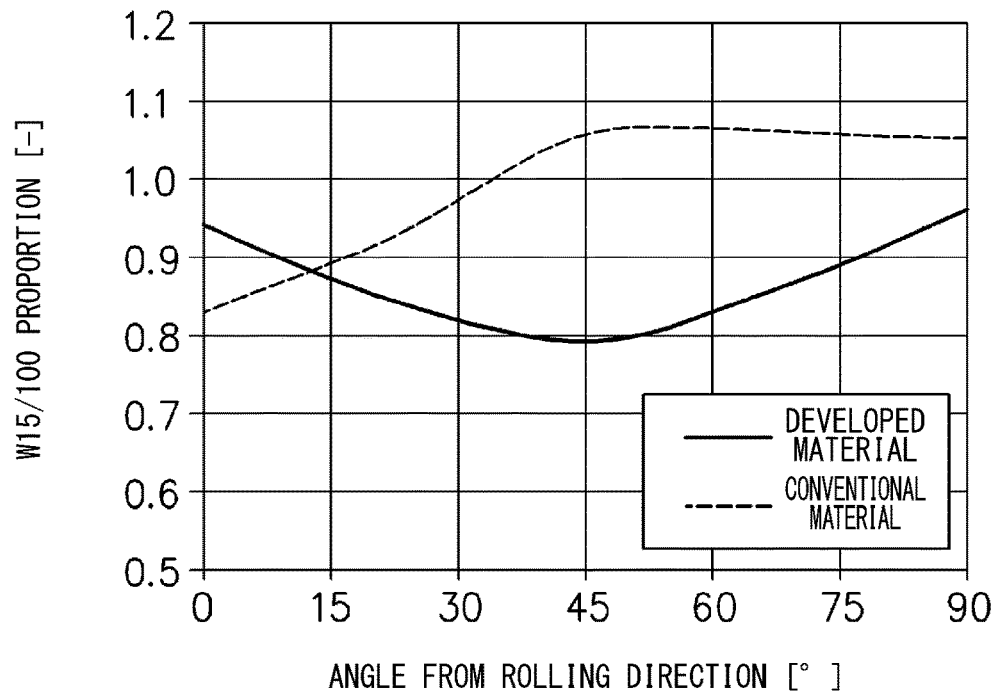
FIG. 6 is a graph showing an example of a relationship between W15/100 proportions and the angles from the rolling direction.

FIG. 4 is a graph showing an example of the relationship between the B50 proportions and the angles from the rolling direction. FIG. 5 is a graph showing an example of the relationship between the W15/50 proportions and the angles from the rolling direction. FIG. 6 is a graph showing an example of the relationship between the W15/100 proportions and the angles from the rolling direction.

Figure 7:
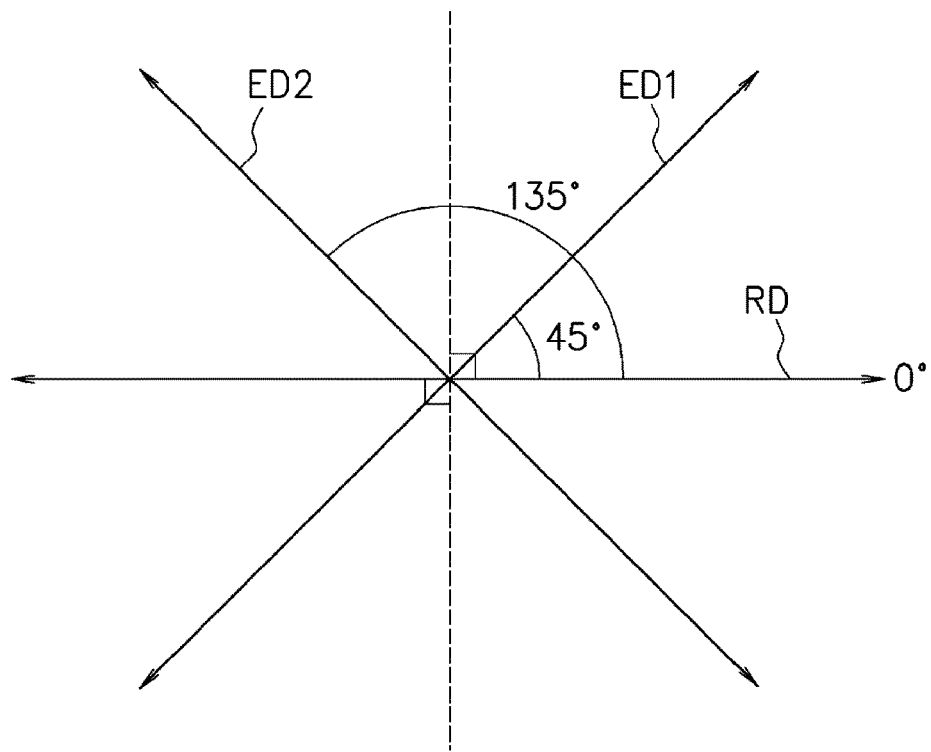
FIG. 7 is a view showing an example of a relationship between the rolling direction and directions in which magnetic characteristics are most favorable.

FIG. 7 is a view showing an example of the relationship between the rolling direction RD and directions in which magnetic characteristics are most favorable. In the following description, the direction in which the magnetic characteristics are most favorable will be referred to as the direction of easy magnetization as necessary. In FIG. 7, when counterclockwise angles are defined as positive value angles and the angle of the rolling direction RD is set to 0°, the directions of easy magnetization are ED1 and ED2. The magnetic characteristics in four regions from the rolling direction RD to a direction in which a small angle between two angles from the rolling direction RD becomes 90° (a direction indicated by the broken line in FIG. 7), theoretically, have a symmetrical relationship.

In addition, the B50 proportion, W15/50 proportion, and W15/100 proportion shown in FIG. 4, FIG. 5, and FIG. 6 are, similar to Table 5, values normalized with the average value of the conventional material at each angle from the rolling direction. That is, the values of the B50 proportion, the W15/50 proportion, and the W15/100 proportion shown in FIG. 4, FIG. 5, and FIG. 6 are relative values (dimensionless quantities).

As shown in FIG. 4, in the developed material, the B50 proportion is the largest when the angle from the rolling direction is 45°, and the B50 proportion becomes smaller as the angle from the rolling direction approaches 0° and 90°.

On the other hand, in the conventional material, the B50 proportion is the smallest when the angle from the rolling direction is 45°.

As shown in FIG. 5 and FIG. 6, in the developed material, the W15/50 proportion and the W15/100 proportion are the largest when the angle from the rolling direction is 45°, and the W15/50 proportion and the W15/100 proportion become smaller as the angle from the rolling direction approaches 0° and 90°.

On the other hand, in the conventional material, the W15/50 proportion and the W15/100 proportion become large when the angle from the rolling direction is 45° to 90°.

As described above, in the developed material, the magnetic characteristics are most favorable in a direction at an angle of 45° from the rolling direction (direction of easy magnetization ED1) and in a direction at an angle of 135° from the rolling direction (direction of easy magnetization ED2). On the other hand, the magnetic characteristics are poorest in a direction at an angle of 0° from the rolling direction (rolling direction RD) and in a direction at an angle of 90° from the rolling direction (direction orthogonal to the rolling direction RD).

The present inventors obtained an idea that, when core pieces are produced from the developed material having more favorable magnetic characteristics than the conventional material and a stator core including split cores obtained by laminating the produced core pieces, it is possible to improve the magnetic characteristics of the entire stator core. In addition, in the developed material, the direction in which the magnetic characteristics are excellent is the directions at angles of 45° and 135° from the rolling direction, and the directions in which the magnetic characteristics are excellent are orthogonal to each other. Incidentally, in the core piece as well, the radial direction of the teeth and the extension direction of the core back are orthogonal to each other. Therefore, the present inventors obtained an idea that a core piece can be produced by matching the direction in which the magnetic characteristics of the developed material are excellent to the radial direction of the tooth and the extension direction of the core back.

Based on such ideas, a core piece is configured to have the radial directions of the teeth along a direction at an angle of 45° from the rolling direction in the developed material and to have the extension directions of the core backs along a direction at an angle of 135° from the rolling direction in the developed material. Alternatively, a core piece is configured to have the radial directions of the teeth along a direction at an angle of 135° from the rolling direction in the developed material and to have the extension directions of the core backs along a direction at an angle of 45° from the rolling direction in the developed material.

<Manufacturing Method for Stator Core>

Next, a manufacturing method for the stator core 21 including a step of producing the core piece 40 from the developed material will be described. The manufacturing of the stator core 21 mainly includes a core piece production step, a split core production step, and a stator core production step.

[Core Piece Production Step]

In the core piece production step, the developed material is blanked using a mold to produce the core pieces 40.

Figure 8:
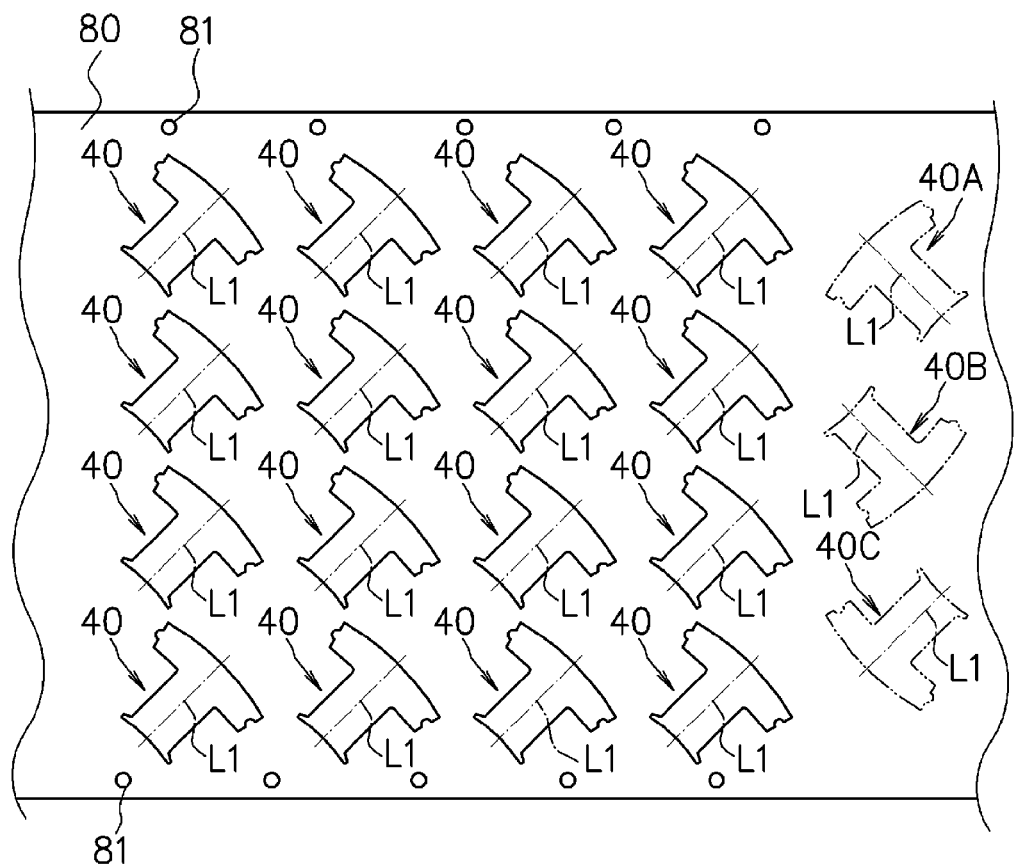
FIG. 8 is a view for describing a mold according to an embodiment of the present invention.
Figure 8:
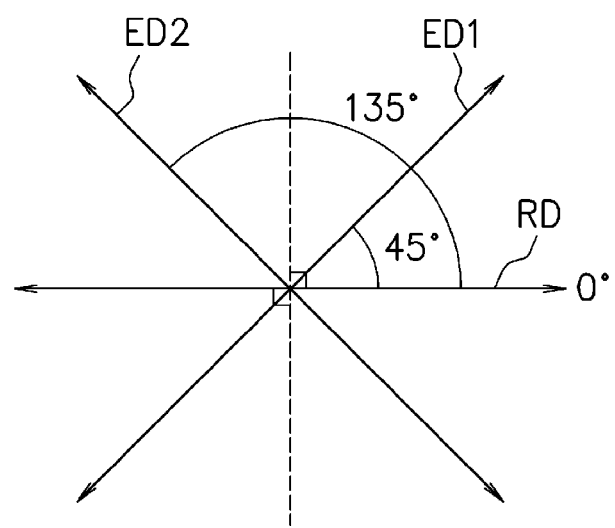

FIG. 8 is a view for describing the mold for blanking the developed material. FIG. 8 is a schematic view (plan view) as viewed in a direction orthogonal to the sheet surface of a developed material 80. In FIG. 8, the rolling direction RD and the directions in which the magnetic characteristics are excellent (ED1 and ED2) are indicated based on the developed material 80.

The developed material 80 has a strip shape in which the rolling direction RD is in the longitudinal direction. The developed material 80 is conveyed along the longitudinal direction with a conveying apparatus. Therefore, in the example shown in FIG. 8, the rolling direction RD and the conveying direction with the conveying apparatus are the same as each other. Pilot holes 81 are provided at both end portions of the developed material 80 in the width direction at intervals in the longitudinal direction.

First, the conveying apparatus inserts pilots into the pilot holes 81 and conveys the developed material 80 a certain distance. Next, a pressing apparatus blanks the conveyed developed material 80 using a mold having a punch and a die to produce the core pieces 40. Here, a plurality of core pieces 40 having the same shape and the same size are produced by a single round of blanking with the pressing apparatus.

The developed material 80 is blanked with the pressing apparatus so that both the radial direction of the teeth and the extension direction of the core backs of the core pieces 40 become directions in which the magnetic characteristics of the developed material 80 are excellent. Specifically, as shown in FIG. 8, the mold of the pressing apparatus is set such that the radial direction (alternate long and short dash line L1) of the teeth of the core pieces 40 is along the direction at an angle of 45° from the rolling direction of the developed material 80 (along the direction of easy magnetization ED1). Since the radial direction of the teeth and the extension direction of the core backs of the core pieces 40 are orthogonal to each other, when the radial direction of the teeth is along the direction at an angle of 45° from the rolling direction of the developed material 80, the extension direction of the core backs is set so as to be along the direction at an angle of 135° from the rolling direction of the developed material 80 (along the direction of easy magnetization ED2).

Therefore, in the core piece 40 blanked by the pressing apparatus, the radial direction of the tooth is along the direction at an angle of 45° from the rolling direction, and the extension direction of the core back is along the direction at an angle of 135° from the rolling direction. In the present embodiment, all of the core pieces 40 blanked with the pressing apparatus have the same orientation. Therefore, in all of the core pieces 40 to be blanked, the radial direction of the teeth is along the direction at an angle of 45° from the rolling direction, and the extension direction of the core backs is along the direction at an angle of 135° from the rolling direction.

In FIG. 8, the mold that blanks the core pieces 40 such that the radial direction of the teeth is along the direction at an angle of 45° from the rolling direction and the extension direction of the core backs is along the direction at an angle of 135° from the rolling direction has been described, but the mold is not limited to this case.

For example, the mold may be a mold that blanks core pieces such that the radial direction of the teeth is along the direction at an angle of 135° from the rolling direction and the extension direction of the core backs is along the direction at an angle of 45° from the rolling direction as in core pieces 40A and 40B indicated by alternate long and two short dashed lines in FIG. 8. In this case, in the blanked core pieces 40A and 40B, the radial direction of the tooth is along the direction at an angle of 135° from the rolling direction, and the extension direction of the core back is along the direction at an angle of 45° from the rolling direction.

In addition, the mold may be a mold that blanks the core pieces 40 indicated by solid lines in FIG. 8 so as to be in an orientation that is rotated by 180° as in a core piece 40C indicated by an alternate long and two short dashed line in FIG. 8. In this case, in the blanked core piece 40C, similar to the core piece 40 indicated by the solid line in FIG. 8, the radial direction of the tooth is along the direction at an angle of 45° from the rolling direction, and the extension direction of the core back is along the direction at an angle of 135° from the rolling direction.

In addition, FIG. 8 shows a mold that blanks four core pieces 40 on a straight line along the width direction of the developed material 80, but the mold is not limited to this case and may be a mold that blanks five or more or three or less core pieces 40 or may be a mold that blanks core pieces in a zigzag shape with respect to a straight line. In addition, the mold may be a mold that blanks two or more core pieces among the core pieces 40 and 40A to 40C in different orientations shown in FIG. 8 at one time.

[Split Core Production Step]

In the split core production step, the core pieces 40 are laminated to produce the split cores 30.

Specifically, the plurality of core pieces 40 blanked with the pressing apparatus in the core piece production step are all aligned so as to be in the same orientation, then, connected and laminated such that the sheet surfaces are in contact with each other. In order to connect the plurality of core pieces 40, the core pieces 40 can be connected by attaching the sheet surfaces of the core pieces 40 to each other with an adhesive or swaging or welding the core pieces 40 in the lamination direction. The number of the core pieces 40 to be laminated is changed depending on the specifications or size of the stator core 21 to be manufactured. In addition, in the case of manufacturing the stator core 21 of the present embodiment, 12 split cores 30 are produced for one stator core 21.

Here, in the core piece 40, as described above, both the radial direction of the tooth and the extension direction of the core back are in direction in which the magnetic characteristics of the developed material 80 are excellent, and the split cores 30 are aligned and laminated such that all of the core pieces 40 are in the same orientation. Therefore, the split core 30 in which the core pieces 40 are laminated is capable of improving the magnetic characteristics in the tooth portion 31 and the core back portion 32.

[Stator Core Production Step]

In the stator core production step, the split cores 30 are arrayed and connected in the circumferential direction to produce the stator core 21. Specifically, the split cores 30 are arrayed such that the core back portions 32 of the plurality of split cores 30 produced in the split core production step form an annular shape. At this time, the protrusions 43a and the recessed parts 43b of the individual core pieces 40 are fitted with each other in the adjacent split cores 30, thereby determining the positions. In order to connect the split cores 30, the split cores 30 can be connected by attaching the core back portions 32 of the adjacent split cores 30 to each other with an adhesive or welding the core back portions 32.

In addition, in the case of manufacturing the stator core 21 of the present embodiment, 12 split cores 30 are arrayed and connected in the circumferential direction.

The stator core 21 can be manufactured with the above-described steps. When the stator 20 is manufactured or the rotary electric machine 10 is manufactured by using the manufactured stator core 21, a known manufacturing method can be used.

EXAMPLE

Next, the magnetic characteristics were compared between the split core for which the core pieces produced from the developed material were used and the split core for which the core pieces produced from the conventional material were used.

First, a sample of a split core was produced by laminating core pieces produced by blanking the developed material. The split core for which the core pieces of the developed material were used as described above will be referred to as the split core of an invention example. In addition, the core piece obtained by blanking the developed material is referred to as the core piece of the invention example. The split core of the invention example was produced by the method described in the above-described section <Manufacturing method for stator core>. In the core piece of the invention example, the radial direction of the tooth is along the direction at an angle of 45° from the rolling direction in the developed material, and the extension direction of the core back is along the direction at an angle of 135° from the rolling direction in the developed material.

Incidentally, a sample of a split core was produced by laminating core pieces produced by blanking the conventional material. The split core for which the core pieces of the conventional material were used as described above will be referred to as the split core of a comparative example. In addition, the core piece obtained by blanking the conventional material is referred to as the core piece of the comparative example. The split core of the comparative example was produced by the method described in the above-described section <Manufacturing method for stator core>. In the core piece of the comparative example, the radial direction of the tooth is along the direction at an angle of 0° from the rolling direction in the conventional material, and the extension direction of the core back is along the direction at an angle of 90° from the rolling direction in the conventional material.

In addition, the split core of the invention example and the split core of the comparative example have the following specifications.

Outer diameter of stator core: 77.0 [mm], inner diameter of stator core: 40.0 [mm], height (lamination thickness) of stator core: 45.0 [mm], thickness of core piece (electrical steel sheet): 0.25 [mm], number of poles: 10, number of slots: 12

Here, as a comparison of the magnetic characteristics between the split core of the invention example and the split core of the comparative example, the proportions of the magnetic flux density when excited with B50, that is, a magnetic field strength of 5000 [A/m] are shown in Table 6.

TABLE 6

|  | B50 proportion [-] |
|---|---|
| Split core of invention example | 1.042 |
| Split core of comparative example | 1.000 |

As shown in Table 6, in a case where the magnetic flux density of the split core of the comparative example was set to 1.000, the magnetic flux density of the split core of the invention example was 1.042. Table 6 shows that the B50 of the split core of the invention example is larger by 4.2 [%] than the B50 of the split core of the comparative example. As described above, it was possible to confirm that the magnetic flux density was high and the magnetic characteristics improved in the split core for which the core pieces produced from the developed material were used compared with the split core for which the core piece produced from the conventional material were used.

When the split cores of the invention example having a large magnetic flux density are arrayed in the circumferential direction to manufacture a stator core (referred to as the stator core of the invention example), it is possible to increase the magnetic flux density and improve the magnetic characteristics in the entire stator core compared with a stator core manufactured by arranging the split cores of the comparative example in the circumferential direction (referred to as the stator core of the comparative example).

In addition, torque can be improved more by applying the stator core of the invention example having a large magnetic flux density to a rotary electric machine than in a rotary electric machine to which the stator core of the comparative example is applied. In addition, in a case where the rotary electric machine to which the stator core of the invention example is applied outputs the same torque as the rotary electric machine to which the stator core of the comparative example is applied, since it is possible to decrease the current flowing through the coiling coiled around the stator core of the invention example, it is possible to reduce copper losses.

As described above, according to the present embodiment, when the electrical steel sheet of the developed material having excellent magnetic characteristics is used for core pieces that configure split cores, it is possible to improve the magnetic characteristics of a stator core including the split cores as a whole. In addition, according to the present embodiment, since both the radial direction of the tooth and the extension direction of the core back are in the directions in which the magnetic characteristics of the electrical steel sheet of the developed material are excellent in each core piece for all of the split cores provided in the stator core, it is possible to further improve the magnetic characteristics of the entire stator core. When the magnetic characteristics are improved, since it is possible to suppress the magnetic saturation of the stator core even when the width of the tooth portion and the width of the core back portion are narrowed, it is possible to expand the area of slots and to improve the space factor of coilings.

In the present embodiment, the superiority of the developed material compared with the conventional material that is a non-oriented electrical steel sheet has been described, but the developed material is still superior to the conventional material that is a bidirectional electrical steel sheet. Specifically, compared with the case where the conventional material is a bidirectional electrical steel sheet, the developed material is capable of reducing the manufacturing costs. In addition, compared with the case where the conventional material is a bidirectional electrical steel sheet, since the developed material has a steel sheet structure in which grain sizes are small, it is possible to suppress iron losses under high frequency conditions when a split core is configured by laminating core pieces.

Modification Example

In the above-described present embodiment, the case where both the radial direction of the tooth and the extension direction of the core back are in the directions in which the magnetic characteristics of the electrical steel sheet of the developed material are excellent in each core piece for all of the split cores provided in the stator core has been described, but the configuration is not limited to this case.

In the present modification example, a case where both the radial direction of the tooth and the extension direction of the core back simply need to be in the directions in which the magnetic characteristics of the electrical steel sheet of the developed material are excellent in each core piece for at least one split core among the plurality of split cores provided in the stator core will be described. In other words, in a stator core of the present modification example, a split core made up of core pieces in which both the radial direction of the tooth and the extension direction of the core back are along directions in which the magnetic characteristics of the electrical steel sheet of the developed material are excellent and a split core made up of core pieces in which neither the radial direction of the tooth nor the extension direction of the core back is along a direction in which the magnetic characteristics of the electrical steel sheet of the developed material are excellent are present in a mixed form. In a stator core in which different types of split cores are present in a mixed form as described above, a portion having favorable magnetic characteristics and a portion having poor magnetic characteristics occur, a variation is caused in the distribution of the magnetic characteristics of the stator core, and the iron loss becomes large.

In the present modification example, in a case where different types of split cores are present in a mixed form, the stator core is configured such that the widths of the tooth portions having the radial direction along a direction in which the magnetic characteristics are excellent become narrower than the widths of the tooth portions having the radial direction along directions in which the magnetic characteristics are not excellent. Furthermore, in the present modification example, in a case where different types of split cores are present in a mixed form, the stator core is configured such that the product of the width of the tooth portion of the split core and the magnetic flux density in the tooth portion when excited with a predetermined magnetic field strength becomes substantially constant in each tooth portion of all of the split cores. When the stator core is configured as described above, even in the stator core including different types of split cores present in a mixed form, it is possible to reduce the variation in the magnetic flux density and suppress the iron loss.

Figure 9:
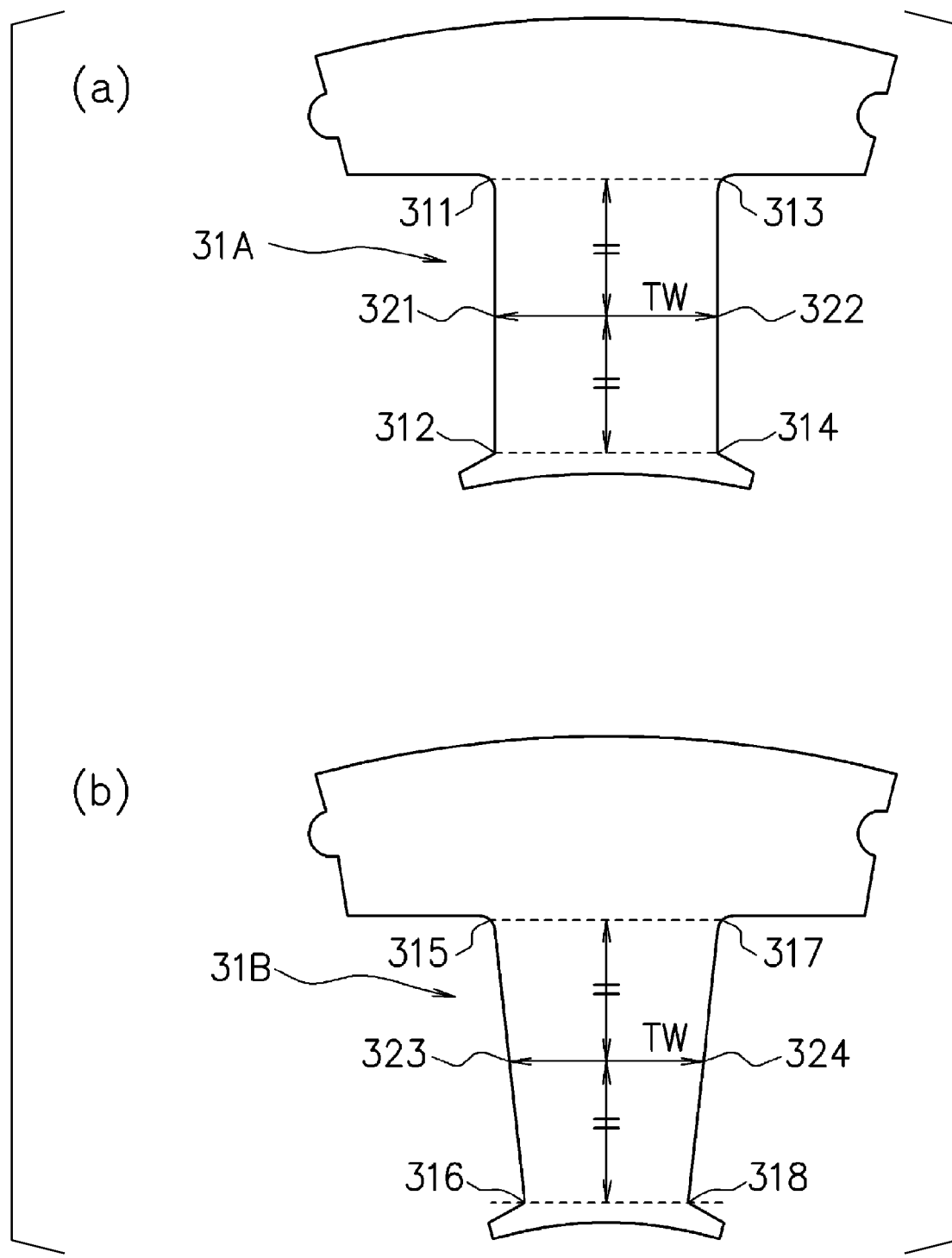
FIG. 9 is a view for describing a width of a tooth portion.

FIG. 9 is a view for describing the width of the tooth portion. FIG. 9(a) is an example of a tooth portion 31A parallel to the radial direction. In this example, the tooth portion 31A itself is parallel to the radial direction. FIG. 9(b) is an example of a tooth portion 31B for which slots are parallel to the radial direction. In this example, a slot positioned between the tooth portions 31B adjacent to each other in the circumferential direction is parallel to the radial direction.

Here, the width of the tooth portion is defined as the length of the stator core in the circumferential direction between the central positions of tooth straight line regions. The tooth straight line region is a region having the longest straight line among the straight lines configuring the end portions of the tooth portion in the circumferential direction of the stator core in a cross section of the stator core cut in a direction perpendicular to the axis of the stator core and is obtained from each of two end portions of the tooth portion in the circumferential direction of the stator core.

In the example shown in FIG. 9(a), a straight line that connects positions 311 and 312 and a straight line that connects positions 313 and 314 are the tooth straight line regions. In addition, in the example shown in FIG. 9(a), the central positions of the tooth straight line regions are positions 321 and 322. Therefore, the width of the tooth portion 31A shown in FIG. 9(a) is a distance TW between the position 321 and the position 322.

In the example shown in FIG. 9(b), a straight line that connects positions 315 and 316 and a straight line that connects positions 317 and 318 are the tooth straight line regions. In addition, in the example shown in FIG. 9(b), the central positions of the tooth straight line regions are positions 323 and 324. Therefore, the width of the tooth portion 31B shown in FIG. 9(b) is a distance TW between the position 323 and the position 324.

Since FIG. 9(a) is an example of a tooth portion 31A parallel to the radial direction, the width of the tooth portion 31A is constant regardless of places in the radial direction in the tooth straight line region.

On the other hand, since FIG. 9(b) is an example of the tooth portion 31B for which slots are parallel to the radial direction, the actual width of the tooth portion 31B differs depending on places in the radial direction in the tooth straight line region. Therefore, the width of the tooth portion 31B is defined as the distance TW between the above-described position 323 and position 324 as a representative value.

In the above-described embodiment, it is possible to produce a split core in which the radial direction of the tooth portions is along a direction in which the magnetic characteristics are excellent by the method described in the section <Manufacturing Method for Stator Core>.

Next, an example of a case where a split core in which the radial direction of the tooth portions is not along a direction in which the magnetic characteristics are excellent is produced. The same contents as the method described in the above-described <Manufacturing method for stator core> will not be described again as appropriate.

First, in the core piece production step, the developed material is blanked using a mold to produce the core pieces 90.

Figure 10:
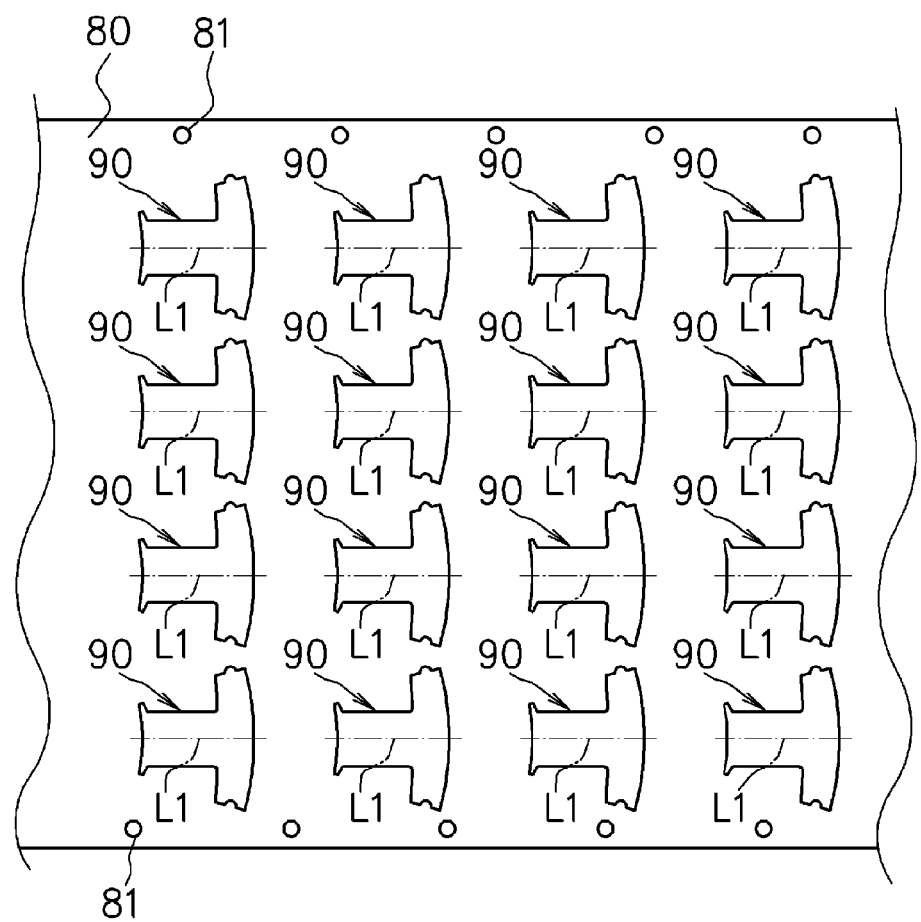
FIG. 10 is a view for describing a mold according to a modification example.
Figure 10:
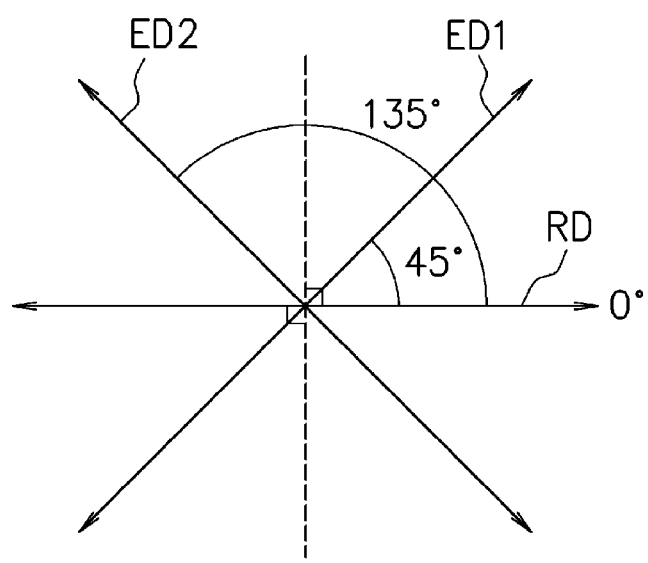

FIG. 10 is a view for describing the mold for blanking the developed material. The developed material 80 shown in FIG. 10 is the same electrical steel sheet as the developed material 80 shown in FIG. 8. In FIG. 10, the rolling direction RD and the directions in which the magnetic characteristics are excellent (ED1 and ED2) are indicated based on the developed material 80.

The developed material 80 is blanked with a pressing apparatus so that both the radial direction of the teeth and the extension direction of the core backs of the core pieces 90 do not become directions in which the magnetic characteristics of the developed material 80 are excellent. Specifically, as shown in FIG. 10, the mold of the pressing apparatus is set such that the radial direction (alternate long and short dash line L1) of the teeth of the core pieces 90 is along the direction at an angle of 0° from the rolling direction of the developed material 80. Since the radial direction of the teeth and the extension direction of the core backs of the core pieces 90 are orthogonal to each other, when the radial direction of the teeth is along the direction at an angle of 0° from the rolling direction of the developed material 80, the extension direction of the core backs is set so as to be along the direction at an angle of 90° from the rolling direction of the developed material 80.

Therefore, in the core piece 90 blanked by the pressing apparatus, the radial direction of the tooth is along the direction at an angle of 0° from the rolling direction, and the extension direction of the core back is along the direction at an angle of 90° from the rolling direction. In the present modification example, in all of the core pieces 90 blanked with the pressing apparatus, the radial directions of the teeth are in the same orientation. Therefore, in all of the core pieces 90 to be blanked, the radial direction of the teeth is along the direction at an angle of 0° from the rolling direction, and the extension direction of the core backs is along the direction at an angle of 90° from the rolling direction.

Next, the plurality of blanked core pieces 90 are all aligned so as to be in the same orientation, then, connected and laminated so that the sheet surfaces are in contact with each other, whereby it is possible to produce a split core in which the radial direction of the tooth portions is not along a direction in which the magnetic characteristics are excellent.

Here, the core piece 90 shown in FIG. 10 and the core piece 40 shown in FIG. 8 are set such that the widths of the teeth are different from each other. Specifically, the width of the tooth in the core piece 90 shown in FIG. 10 is set to be wider than the width of the tooth in the core piece 40 shown in FIG. 8. In other words, the width of the tooth in the core piece 40 shown in FIG. 8 is set to be narrower than the width of the tooth in the core piece 90 shown in FIG. 10.

When a stator core is configured by mixing split cores in which the core pieces 90 shown in FIG. 10 are laminated and split cores in which the core pieces 40 shown in FIG. 8 are laminated, it is possible to configure the stator core such that the widths of the tooth portions having the radial direction along a direction in which the magnetic characteristics are excellent become narrower than the widths of the tooth portions having the radial direction along directions in which the magnetic characteristics are not excellent. When the stator core is configured as described above, it is possible to reduce the variation in the magnetic flux density in the stator core.

In addition, in the present modification example, in a case where different types of split cores are present in a mixed form, the stator core is configured such that the product of the width of the tooth portion of the split core and the magnetic flux density in the tooth portion when excited with a predetermined magnetic field strength becomes substantially constant in each tooth portion of all of the split cores.

Hereinafter, an example of determining the widths of the tooth portions such that the product of the width of the tooth portion and the magnetic flux density in the tooth portion becomes substantially constant in each tooth portion of all of the split cores will be described.

First, in a rotary electric machine to which the stator core is to be applied, in a case where the widths of all of the tooth portions are constant, the average magnetic flux density in the tooth portion when operated under a predetermined operating condition (for example, a predetermined torque) is analyzed. The average magnetic flux density in the tooth portion is a value obtained by averaging the maximum values of the magnetic flux densities in the individual places in the individual tooth portions. The average magnetic flux density can be derived by performing electromagnetic field analysis (numerical value analysis) based on Maxwell's equations or by actually measuring induced voltages using search coils in the manufactured stator core and integrating the induced voltages.

Next, from the average magnetic flux density in the tooth portion, the average magnetic field strength H [A/m] of the tooth portion is calculated. The average magnetic field strength of the tooth portion can be calculated based on the relative magnetic permeability of the developed material. Next, the magnetic flux density B [T] in the tooth portion at each angle from the rolling direction when excited with the average magnetic field strength of the tooth portion is calculated based on the material characteristics of the developed material A. The magnetic flux density in the tooth portion at each angle from the rolling direction can be derived from the B-H characteristics of the developed material at the angle from the rolling direction.

In the present modification example, in the split core in which the core pieces 40 shown in FIG. 8 are laminated, the magnetic flux density in the tooth portion at an angle of 45° from the rolling direction is calculated. In addition, in the split core in which the core pieces 90 shown in FIG. 10 are laminated, the magnetic flux density in the tooth portion at an angle of 0° from the rolling direction is calculated. As described above, in the developed material, the B50 proportion is the largest when the angle from the rolling direction is 45°, and the B50 proportion becomes smaller as the angle from the rolling direction approaches 0° and 90°. Therefore, the magnetic flux density in the tooth portion at an angle of 45° from the rolling direction is calculated to be large, and the magnetic flux density in the tooth portion at an angle of 0° from the rolling direction is calculated to be small.

Next, the optimum widths of the tooth portions are determined at each angle from the rolling direction. Specifically, the widths of the tooth portions are determined based on the calculated magnetic flux densities in the tooth portions at each angle from the rolling direction such that the product of the width of the tooth portion and the magnetic flux density in the tooth portion becomes substantially constant in each tooth portion.

Therefore, in the split core in which the core pieces 40 shown in FIG. 8 are laminated, the widths of the tooth portions are calculated to be narrow, and, in the split core in which the core pieces 90 shown in FIG. 10 are laminated, the widths of the tooth portions are calculated to be wide.

A mold that blanks the core pieces 40 shown in FIG. 8 and a mold that blanks the core pieces 90 shown in FIG. 10 are each designed so as to obtain the optimum widths of the tooth portions determined as described above. The developed material is blanked with each designed mold, thereby producing the core pieces 40 or the core pieces 90.

When a stator core is configured by mixing split cores in which the core pieces 40 shown in FIG. 8 are laminated and split cores in which the core pieces 90 shown in FIG. 10 are laminated, it is possible to configure the stator core such that the product of the width of the tooth portion of the split core and the magnetic flux density in the tooth portion when excited with a predetermined magnetic field strength becomes substantially constant in each tooth portion of all of the split cores.

As described above, in the present modification example, in a case where different types of split cores are present in a mixed form, the stator core is configured such that the product of the width of the tooth portion of the split core and the magnetic flux density in the tooth portion when excited with a predetermined magnetic field strength becomes substantially constant in each tooth portion of all of the split cores. Therefore, even in the stator core including different types of split cores present in a mixed form, it is possible to reduce the variation in the magnetic flux density and suppress the iron loss. The expression "being substantially constant" does not only refer to the case of being completely constant, but also refers to the case of being substantially constant to an extent that the iron loss can be suppressed more than in comparative examples. Specifically, the expression "being substantially constant" means that the difference between the maximum value and the minimum value of the product of the width of the tooth portion and the magnetic flux density in the tooth portion is within a range of ±5%. For example, in a case where the product of the width of the tooth portion and the magnetic flux density in the tooth portion is 1.5 [T], the product of the width of the tooth portion and the magnetic flux density in the tooth portion in each tooth portion is approximately within a range of 1.425 [T] to 1.575 [T] (within a range of ±5%).

In the present modification example, the case where the average magnetic flux density in the tooth portion when operated under a predetermined operating condition (for example, a predetermined torque) is analyzed has been described, but the predetermined operating condition can be appropriately selected. For example, an operating condition having the highest proportion of an operating time among a plurality of supposed operating conditions may be set as a predetermined operating condition. In addition, the determined optimum width of the tooth may be further weighted based on the proportion of the operating time under each of the plurality of operating conditions.

In addition, in the present modification example, the stator core in which two types of split cores are present in a mixed form has been described, but the present invention is not limited to this case and can also be applied to a stator core in which three or more types of split cores are present in a mixed form.

Hitherto, the present invention has been described together with a variety of embodiments, but the present invention is not limited only to these embodiments and can be modified or the like within the scope of the present invention.

INDUSTRIAL APPLICABILITY

According to the present invention, it is possible to improve the magnetic characteristics of a stator core including a plurality of split cores. Therefore, the present disclosure is highly industrially applicable.

BRIEF DESCRIPTION OF THE REFERENCE SYMBOLS

- 10: Rotary electric machine
- 21: Stator core
- 30: Split core
- 31: Tooth portion
- 32: Core back portion
- 40: Core piece
- 41: Tooth
- 42: Core back
- 50: Rotor
- 51: Rotor core
- 52: Permanent magnet
- 60: Rotating shaft

The invention claimed is:

1. A stator core comprising:
a plurality of split cores,
wherein the plurality of split cores are each configured by laminating core pieces made of an electrical steel sheet,
the electrical steel sheet has a chemical composition containing, by mass %,
C: 0.0100% or less,
Si: 1.50% to 4.00%,
sol. Al: 0.0001% to 1.0%,
S: 0.0100% or less,
N: 0.0100% or less,
one or more selected from the group of Mn, Ni, Co, Pt, Pb, Cu and Au: 2.50% to 5.00% in total,
Sn: 0.000% to 0.400%,
Sb: 0.000% to 0.400%,
P: 0.000% to 0.400%, and
one or more selected from the group of Mg, Ca, Sr, Ba, Ce, La, Nd, Pr, Zn and Cd: 0.0000% to 0.0100% in total,
in which, when a Mn content (mass %) is indicated by (Mn), a Ni content (mass %) is indicated by (Ni), a Co content (mass %) is indicated by (Co), a Pt content (mass %) is indicated by (Pt), a Pb content (mass %) is indicated by (Pb), a Cu content (mass %) is indicated by (Cu), an Au content (mass %) is indicated by (Au), a Si content (mass %) is indicated by (Si), and a sol. Al content (mass %) is indicated by (sol. Al), Formula (1) below is satisfied, and
a remainder includes Fe and impurities,
when a value of B50 in a rolling direction is indicated by B50L, a value of B50 in a direction inclined by 45° from the rolling direction is indicated by B50D1, a value of B50 in a direction inclined by 90° from the rolling direction is indicated by B50C, and a value of B50 in a direction inclined by 135° from the rolling direction is indicated by B50D2, Formula (2) and Formula (3) below are satisfied, and an X-ray random intensity ratio in {100}<011> is 5 or more and less than 30,
a sheet thickness is 0.50 mm or less, and, in the core pieces of at least one split core in the plurality of split cores, radial directions of teeth and extension directions of core backs are all along a direction at angles of 45° or 135° from the rolling direction of the electrical steel sheet, $$((Mn)+(Ni)+(Co)+(Pt)+(Pb)+(Cu)+(Au))-((Si)+(sol.Al))>0\% \quad (1),$$

$$(B50D1+B50D2)/2>1.7T \quad (2), \text{ and}$$

$$(B50D1+B50D2)/2>(B50L+B50C)/2 \quad (3).$$

2. The stator core according to claim 1, wherein Formula (4) below is satisfied, $$(B50D1+B50D2)/2>1.1\times(B50L+B50C)/2 \quad (4).$$

3. The stator core according to claim 1, wherein Formula (5) below is satisfied, $$(B50D1+B50D2)/2>1.2\times(B50L+B50C)/2 \quad (5).$$

4. The stator core according to claim 1, wherein Formula (6) below is satisfied, $$(B50D1+B50D2)/2>1.8T \quad (6).$$

5. The stator core according to claim 1,
wherein, in the electrical steel sheet,
the radial directions of the teeth are along any one direction at an angle of 45° or 135° from the rolling direction, and
the extension directions of the core backs are along the other direction at an angle of 45° or 135° from the rolling direction.

6. The stator core according to claim 1,
wherein, in the plurality of split cores,
in the core pieces of all of the split cores, both the radial directions of the teeth and the extension directions of the core backs are along the direction at angles of 45° or 135° from the rolling direction of the electrical steel sheet.

7. The stator core according to claim 1,
wherein the plurality of split cores each have a tooth portion, and
among a plurality of the tooth portions, widths of the tooth portions along the direction at angles of 45° or 135° from the rolling direction of the electrical steel sheet are narrower than widths of the tooth portions not along the direction at angles of 45° or 135° from the rolling direction of the electrical steel sheet.

8. The stator core according to claim 7,
wherein a product of the width of the tooth portion and a magnetic flux density in the tooth portion when excited with a predetermined magnetic field strength is substantially constant in each tooth portion of the plurality of split cores.

9. A rotary electric machine comprising:
the stator core according to claim 1.

10. A stator core comprising:
a plurality of split cores,
wherein the plurality of split cores are each configured by laminating core pieces made of an electrical steel sheet,
the electrical steel sheet has a chemical composition containing, by mass %,
C: 0.0100% or less,
Si: 1.50% to 4.00%,
sol. Al: 0.0001% to 1.0%,
S: 0.0100% or less,
N: 0.0100% or less,
one or more selected from the group of Mn, Ni, Co, Pt, Pb, Cu and Au: 2.50% to 5.00% in total,
Sn: 0.000% to 0.400%,
Sb: 0.000% to 0.400%,
P: 0.000% to 0.400%, and
one or more selected from the group of Mg, Ca, Sr, Ba, Ce, La, Nd, Pr, Zn and Cd: 0.0000% to 0.0100% in total,
in which, when a Mn content (mass %) is indicated by (Mn), a Ni content (mass %) is indicated by (Ni), a Co content (mass %) is indicated by (Co), a Pt content (mass %) is indicated by (Pt), a Pb content (mass %) is indicated by (Pb), a Cu content (mass %) is indicated by (Cu), an Au content (mass %) is indicated by (Au), a Si content (mass %) is indicated by (Si), and a sol. Al content (mass %) is indicated by (sol. Al), Formula (1) below is satisfied, and a remainder includes Fe and impurities, when a value of B50 in a rolling direction is indicated by B50L, a value of B50 in a direction inclined by 45° from the rolling direction is indicated by B50D1, a value of B50 in a direction inclined by 90° from the rolling direction is indicated by B50C, and a value of B50 in a direction inclined by 135° from the rolling direction is indicated by B50D2, Formula (2) and Formula (3) below are satisfied, and an X-ray random intensity ratio in {100}<011> is 5 or more and less than 30, a sheet thickness is 0.50 mm or less, $$((Mn)+(Ni)+(Co)+(Pt)+(Pb)+(Cu)+(Au))-((Si)+(sol.\ Al))>0\% \qquad (1),$$

$$(B50D1+B50D2)/2>1.7T \qquad (2),\ and$$

$$(B50D1+B50D2)/2>(B50L+B50C)/2 \qquad (3).$$

* * * * *